(12) United States Patent
Terahara

(10) Patent No.: US 6,271,945 B1
(45) Date of Patent: *Aug. 7, 2001

(54) APPARATUS AND METHOD FOR CONTROLLING POWER LEVELS OF INDIVIDUAL SIGNAL LIGHTS OF A WAVELENGTH DIVISION MULTIPLEXED SIGNAL LIGHT

(75) Inventor: Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/395,168

(22) Filed: Sep. 14, 1999

Related U.S. Application Data

(63) Continuation of application No. 08/773,080, filed on Dec. 26, 1996.

(30) Foreign Application Priority Data

Mar. 18, 1996 (JP) ...................................................... 8-061231

(51) Int. Cl.$^7$ ........................................................ H04J 14/02
(52) U.S. Cl. ............................................ 359/124; 359/161
(58) Field of Search .................................... 359/124, 161, 359/173, 174, 187; 372/23, 29, 33; 385/15, 27

(56) References Cited

U.S. PATENT DOCUMENTS

| | | | |
|---|---|---|---|
| 4,933,929 | 6/1990 | Tajima ................................. | 359/133 |
| 5,225,922 | 7/1993 | Chraplyvy et al. ................... | 359/124 |
| 5,245,681 | 9/1993 | Guignard .............................. | 385/16 |
| 5,396,360 | 3/1995 | Majima ............................ | 359/124 X |
| 5,408,349 | 4/1995 | Tsushima et al. .................... | 359/124 |

FOREIGN PATENT DOCUMENTS

| | | |
|---|---|---|
| 506567 | 9/1992 | (EP) . |
| 7727 | 1/1989 | (JP) . |
| 129541 | 5/1989 | (JP) . |
| 164135 | 6/1989 | (JP) . |
| 78827 | 3/1992 | (JP) . |
| 327662 | 12/1993 | (JP) . |
| 164517 | 6/1994 | (JP) . |
| 30520 | 1/1995 | (JP) . |

OTHER PUBLICATIONS

A.R. Chraplyvy, et al.; Equalization in Amplified WDM Lightwave Transmission Systems; IEEE Photonics Technology Letters, vol. 4, No. 8, Aug. 1992; pp. 920–922.

*Primary Examiner*—Thomas Mullen
(74) *Attorney, Agent, or Firm*—Staas & Halsey LLP

(57) ABSTRACT

An apparatus and method for controlling power levels of individual signal lights of a wavelength division multiplexed (WDM) signal light. The apparatus includes an optical fiber, a coupler and a controller. The WDM signal light travels through the optical fiber. The WDM signal light includes a plurality of individual signal lights which each have a corresponding power level. The coupler decouples a portion of the WDM signal light from the optical fiber. The controller determines the spectrum of the WDM signal light from the decoupled portion and controls the power levels of the plurality of individual signal lights in accordance with the determined spectrum. More specifically, the controller can control the relative power levels of the plurality of individual signal lights with respect to each other. In addition, the controller can control the power levels of the plurality of individual signal lights to perform preemphasis on the WDM signal light. The controller can control the power levels of the plurality of individual signal lights to obtain substantially equal signal to noise ratios of the plurality of individual signal lights as received by a receiver through the optical fiber. The method includes the steps of (a) decoupling a portion of a WDM signal light travelling through an optical fiber (b) determining the spectrum of the WDM signal light from the decoupled portion, and (c) controlling the power levels of individual signal lights of the WDM signal light in accordance with the determined spectrum.

25 Claims, 15 Drawing Sheets

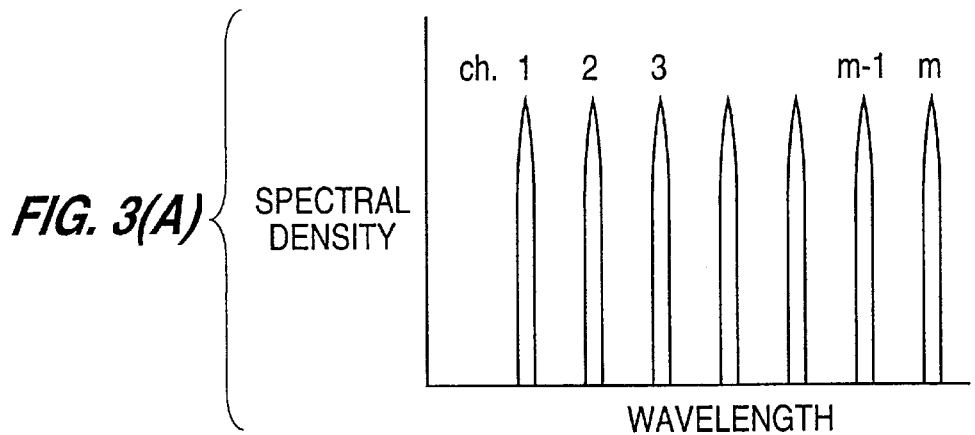
FIG. 3(A) SPECTRAL DENSITY
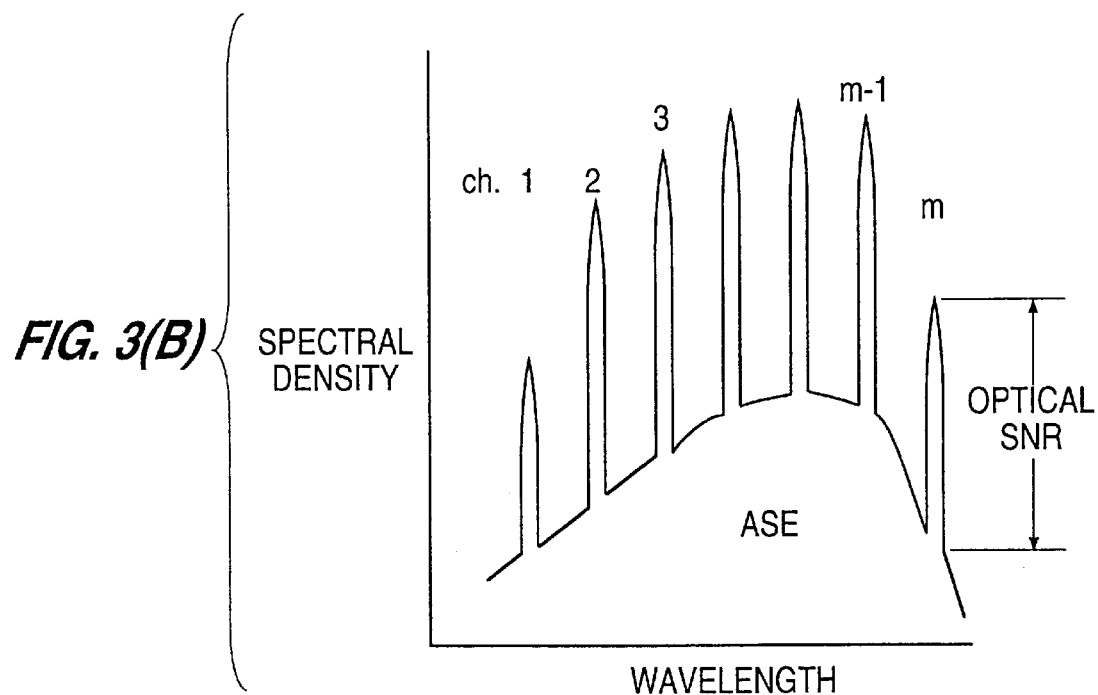
FIG. 3(B) SPECTRAL DENSITY

APPARATUS AND METHOD FOR CONTROLLING POWER LEVELS OF INDIVIDUAL SIGNAL LIGHTS OF A WAVELENGTH DIVISION MULTIPLEXED SIGNAL LIGHT

This application is a continuation of application Ser. No. 08/773,080, filed Dec. 26, 1996, now pending.

CROSS-REFERENCE TO RELATED APPLICATIONS

This application is related to, and based on, Japanese patent application 08-061231, filed Mar. 18, 1996, in Japan, and which is incorporated herein by reference.

BACKGROUND OF THE INVENTION

1. Field of the Invention

The present invention relates to an apparatus and method for controlling power levels of individual signal lights, or channels, of a wavelength division multiplexed (WDM) signal light travelling through an optical fiber. More particularly, the present invention relates to an apparatus and method for determining the spectrum of the WDM signal light and controlling the power levels of the individual signal lights in accordance with the determined spectrum.

2. Description of the Related Art

Generally, conventional optical communication systems connect a transmitting station to a receiving station through an optical transmission line. Moreover, wavelength division multiplexing (WDM) techniques can be employed to increase the transmission capacity of the optical communication system.

FIG. 1 is a diagram illustrating an optical communication system which employs WDM techniques. Referring now to FIG. 1, a transmitting station 2 produces a WDM signal, and provides the WDM signal to an optical fiber transmission line 4. The WDM signal travels through optical fiber transmission line 4 to be received by a receiving station 6.

A plurality of optical repeaters 10 are provided along optical fiber transmission line 4. Each optical repeater 10 includes an optical amplifier 8 for amplifying the WDM signal. Typically, optical amplifiers 8 are erbium doped fiber amplifiers (EDFA).

FIG. 2 is a diagram illustrating a conventional transmitting station 2, for use in the optical communication system illustrated in FIG. 1. Referring now to FIG. 2, transmitting station 2 includes m optical transmitters 12 (#1 to #m) corresponding, respectively, to a first channel (ch. 1) to an m-th channel (ch. m), where m is an integer greater than 1. Each optical transmitter 12 (#1 to #m) produces a signal light having a wavelength which is different than the wavelength of the signal lights produced by the other optical transmitters. More specifically, the wavelengths of the signal lights produced by optical transmitters 12 (#1 to #m) are set to $\lambda 1$ to $\lambda m$, respectively.

Optical transmitters 12 (#1 to #m) include laser diodes 14 (#1 to #m), respectively, and optical modulators 16 (#1 to #m), respectively. Thus, laser diodes 14 (#1 to #m) generate carrier lights having predetermined wavelengths, and optical modulators 16 (#1 to #m) modulate the carrier lights with information. More specifically, for example, optical transmitter 12 (#1) includes laser diode 14 (#1) and optical modulator 16 (#1). Laser diode 14 (#1) generates carrier light at a wavelength $\lambda 1$. Optical modulator 16 (#1) modulates the carrier light with information from a main signal (not illustrated).

The signal lights from ch. 1 to ch. m are received by an optical multiplexer (MUX) 18 through optical connectors OC. Optical multiplexer 18 wavelength-division multiplexes the signal lights together, to form a wavelength division multiplexed (WDM) WDM signal light. The WDM signal light is provided to optical fiber transmission line 4 for transmission to other devices (such as receiving station 6 illustrated in FIG. 1). Typically, a polarization dependent device (PDD), such as a polarization scrambler or an external modulator, is included in optical fiber transmission line 4.

FIG. 3(A) is a graph illustrating an example of a spectrum of the WDM signal light formed by optical multiplexer 18 of transmitting station 2 and before the WDM signal light is transmitted through optical fiber transmission line 4. As illustrated in FIG. 3(A), in this example, the power levels of the signal lights in all the channels are assumed to be equal to each other.

FIG. 3B is a graph illustrating the spectrum of the WDM signal light after being transmitted by transmitting station 2 through optical fiber transmission line 4 and received by, for example, receiver 6 (see FIG. 1). If the spectral density along the vertical axis in FIG. 3(B) is represented by logarithm, a difference in level between signal light power and ASE power corresponds to an optical signal-to-noise ratio (SNR). The optical SNR of signal light after opto-electric conversion (that is, after being converted from an optical signal into an electrical signal) is referred to as the "electric" SNR or simply as the SNR. The optical SNR or electric SNR is an important parameter determining transmission quality of the optical communication system.

As apparent from FIG. 3(B), amplified spontaneous emission (ASE) in each optical amplifier 8 (see FIG. 1) is cumulatively added to the WDM signal light, so that a sharp spectrum of signal light in each channel is superimposed on a relatively gentle spectrum of ASE. As a result, the power levels of the signal lights in all the channels are no longer equal to each other. Thus, the relative power levels of the signal lights have changed, thereby indicating that the "power relativity" of the WDM signal light has changed. Moreover, the relative SNRs of the channels have also changed.

There are several problems in attempting to maintain a constant power relativity of the WDM signal or constant relative SNRs of the channels. For example, referring again to transmitting station 2 illustrated in FIG. 2, the amount of loss of signal light in a specific channel is due, for example, to loss by optical multiplexer 18, connection loss by optical connectors (OC), loss by the polarization dependent device (PDD), and other such losses. As a result, the amount of loss in a specific channel will be different from the amount of loss in a different channel. Further, these losses vary with changes in polarization condition.

Accordingly, even if each optical transmitter 12 (#1 to #m) provides, for example, an automatic level control (ALC) function to maintain the output power level of the channel at a specific level, the power relativity in the WDM signal light output from transmitting station 2 will be varied. Therefore, the optical communication system experiences unstable transmission characteristics.

Moreover, the gain and ASE power of optical amplifier 8 in a specific channel may be different from those in another channel. For example, the gain and ASE power of an optical amplifier for a specific channel depend not only on the power of a signal light in the channel, but also on the power of signal light in other channels. Therefore, when the relative power levels of signal lights in the WDM signal light change in a transmitting station, signal light power and optical SNR in each channel after transmission are varied by optical amplifiers 8.

Accordingly, even if the powers of signal lights in all the channels before transmission are set to equal values (as illustrated, for example, in FIG. 3(A)), the power relativity and optical SNR in the WDM signal light after transmission become different in all the channels (as illustrated, for example, in FIG. 3(B)). As a result, undesireably different transmission characteristics are obtained in the various channels.

SUMMARY OF THE INVENTION

Accordingly, it is an object of the present invention to provide an optical communication system which has stable transmission characteristics (for example, electric SNR and bit error rate) by controlling the total power and the power relativity of a WDM signal light.

It is an additional object of the present invention to provide an optical communication system which can transmit WDM signal light at a desired, or target, power relativity.

Additional objects and advantages of the invention will be set forth in part in the description which follows, and, in part, will be obvious from the description, or may be learned by practice of the invention.

Objects of the present invention are achieved by providing an apparatus which includes an optical fiber, a coupler and a controller. A wavelength division multiplexed (WDM) signal light travels through the optical fiber. The WDM signal light includes a plurality of individual signal lights which each have a corresponding power level. The coupler decouples a portion of the WDM signal light from the optical fiber. The controller determines the spectrum of the WDM signal light from the decoupled portion and controls the power levels of the plurality of individual signal lights in accordance with the determined spectrum. More specifically, the controller can control the relative power levels of the plurality of individual signal lights with respect to each other. In addition, the controller can control the power levels of the plurality of individual signal lights to perform preemphasis on the WDM signal light. Alternatively, the controller can control the power levels of the plurality of individual signal lights to obtain substantially equal signal to noise ratios of the plurality of individual signal lights as received by a receiver through the optical fiber.

Objects of the present invention are also achieved by providing an apparatus which includes a plurality of transmitters which produce a plurality of respectfully corresponding individual signal lights that each have a corresponding power level. A multiplexer multiplexes the plurality of individual signal lights together to produce a WDM signal light. An optical fiber receives the WDM signal light and propagates the WDM signal light therethrough. A coupler decouples a portion of the WDM signal light from the optical fiber. In addition, a controller determines the spectrum of the WDM signal light from the decoupled portion and controls the power levels of the plurality of individual signal lights in accordance with the determined spectrum.

Objects of the present invention are further achieved by providing an optical communication system which includes a transmitting station and a receiving station. The transmitting station produces a wavelength division multiplexed (WDM) signal light including a plurality of individual signal lights each having a corresponding power level. The receiving station receives the WDM signal light from the transmitting station, detects a signal to noise ratio of each individual signal light in the received WDM signal light and produces a corresponding detection signal. The receiving station then provides the detection signal to the transmitting station. The transmitting station includes a controller which, based on the detection signal, controls the power levels of the plurality of individual signal lights to obtain substantially equal signal to noise ratios of the plurality of individual signal lights at the receiving station.

Objects of the present invention are also achieved by providing a method which includes the steps of (a) decoupling a portion of a wavelength division multiplexed (WDM) signal light travelling through an optical fiber, the WDM signal light including a plurality of individual signal lights which each have a corresponding power level, (b) determining the spectrum of the WDM signal light from the decoupled portion, and (c) controlling the power levels of the plurality of individual signal lights in accordance with the determined spectrum.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 3(A) is a graph illustrating a spectrum of a WDM signal light before being transmitted by the transmitting station illustrated in FIG. 2.

FIG. 3(B) is a graph illustrating a spectrum of a WDM signal light after being transmitted by the transmitting station illustrated in FIG. 2 and received by a receiver.

DETAILED DESCRIPTION OF THE PREFERRED EMBODIMENTS

Figure 1:
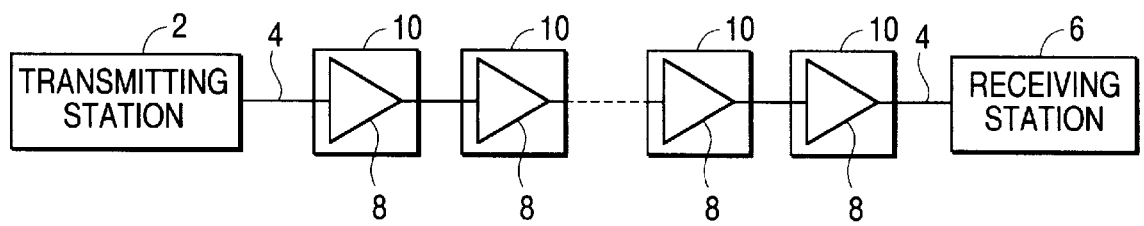
FIG. 1 (prior art) is a diagram illustrating an optical communication system.

Reference will now be made in detail to the preferred embodiments of the present invention, examples of which are illustrated in the accompanying drawings, wherein like reference numerals refer to the same or similar elements throughout.

As described above, an optical communication system as illustrated in FIG. 1 can experience difficulties in maintaining equal power levels, or constant relative power levels, in each channel of a WDM signal light at the output of a transmitting station, or in maintaining equal SNRs in each channel at a receiving station. However, the following embodiments of the present invention will allow equal power levels, or constant relative power levels, to be maintained in each channel at the output of the transmitting station, and will allow equal SNRs to be maintained in each channel at the receiving station.

More specifically, a technique hereinafter referred to as "preemphasis" can be applied to the optical communication system illustrated in FIG. 1, to allow equal SNRs to be maintained in each channel at the receiving station.

Figure 4A:
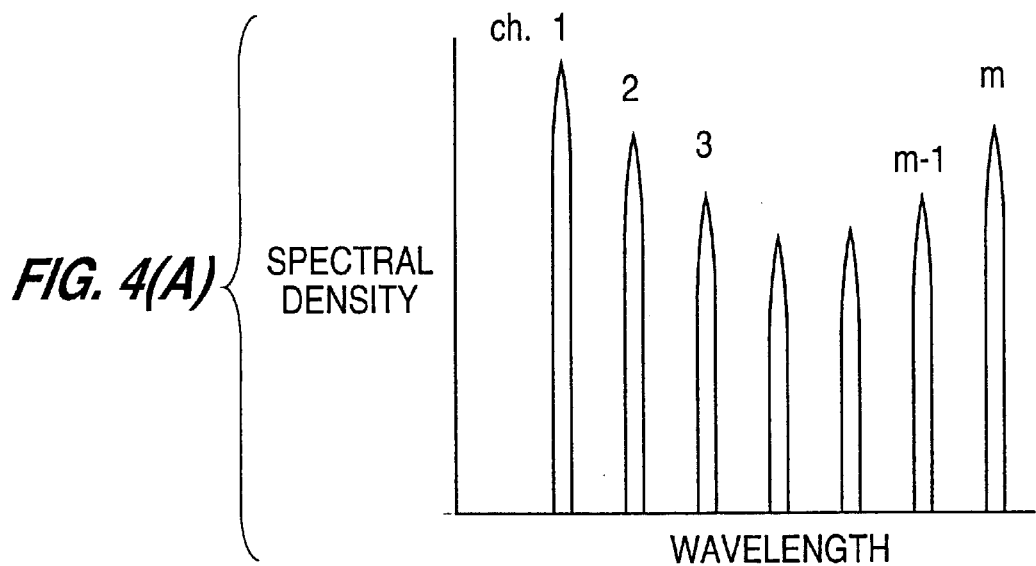
FIG. 4(A) is a graph illustrating a spectrum of a WDM signal light before being transmitted, with preemphasis being performed, according to an embodiment of the present invention.

FIG. 4(A) is a graph illustrating a spectrum of a WDM signal light at the output of a transmitting station and before being transmitted to a receiving station, with preemphasis being performed, according to an embodiment of the present invention. Referring now to FIG. 4(A), the powers of signal lights in all the channels before transmission are set to different values.

Figure 4B:
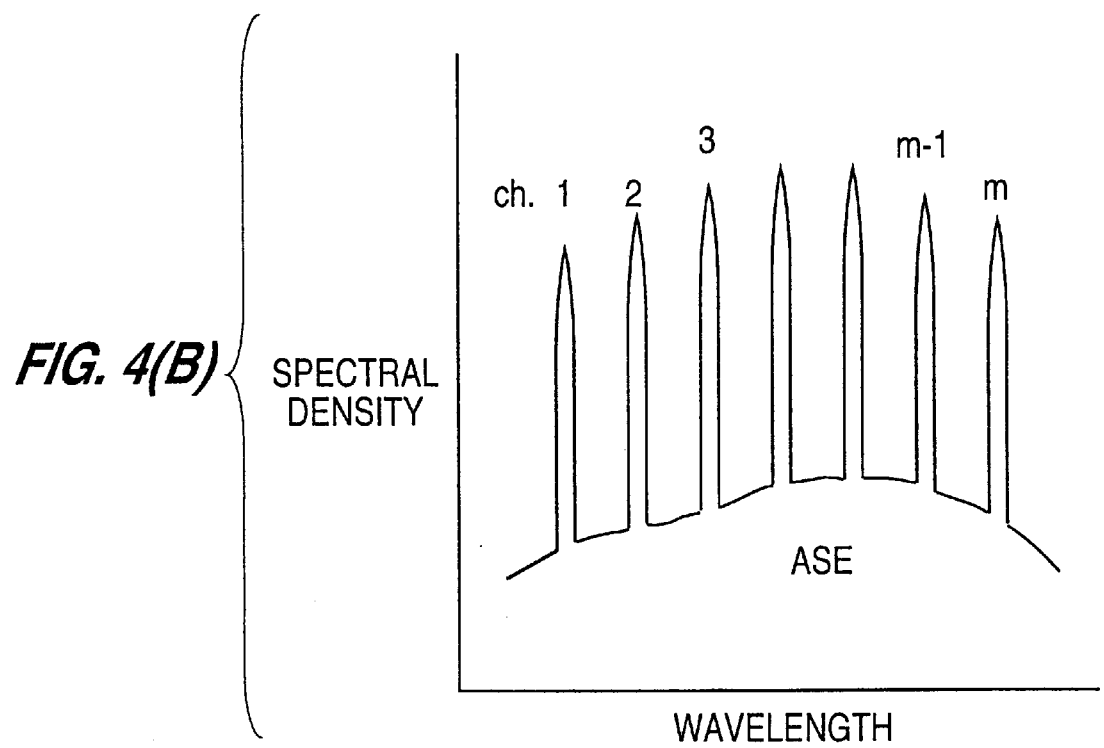
FIG. 4(B) is a graph illustrating a spectrum of WDM signal light after being transmitted and received by a receiver, with preemphasis being performed, according to an embodiment of the present invention.

FIG. 4(B) is a graph illustrating a spectrum of WDM signal light after being transmitted and received by a receiving station, with preemphasis being performed, according to an embodiment of the present invention. Referring now to FIG. 4(B), equal optical SNRs in all the channels after transmission are obtained. Therefore, by maintaining the spectrum illustrated in FIG. 4(A) before transmission, the desirable spectrum illustrated in FIG. 4(B) will be obtained at the receiving station.

One method for performing preemphasis includes, for example, the following steps:

(a) Setting the power of each signal light to an initial value.

(b) Measuring transmission characteristics (for example, electric SNR in a receiving station; Q-factor) in each channel.

(c) Increasing the power of signal light in a channel having a relatively low electric SNR, and decreasing the power of signal lights in a channel having a relatively high electric SNR.

(d) Repeating the steps (b) and (c) until the electric SNRs in all the channels become equal to each other.

A system suitable for performing such preemphasis will be hereinafter described.

Figure 5:
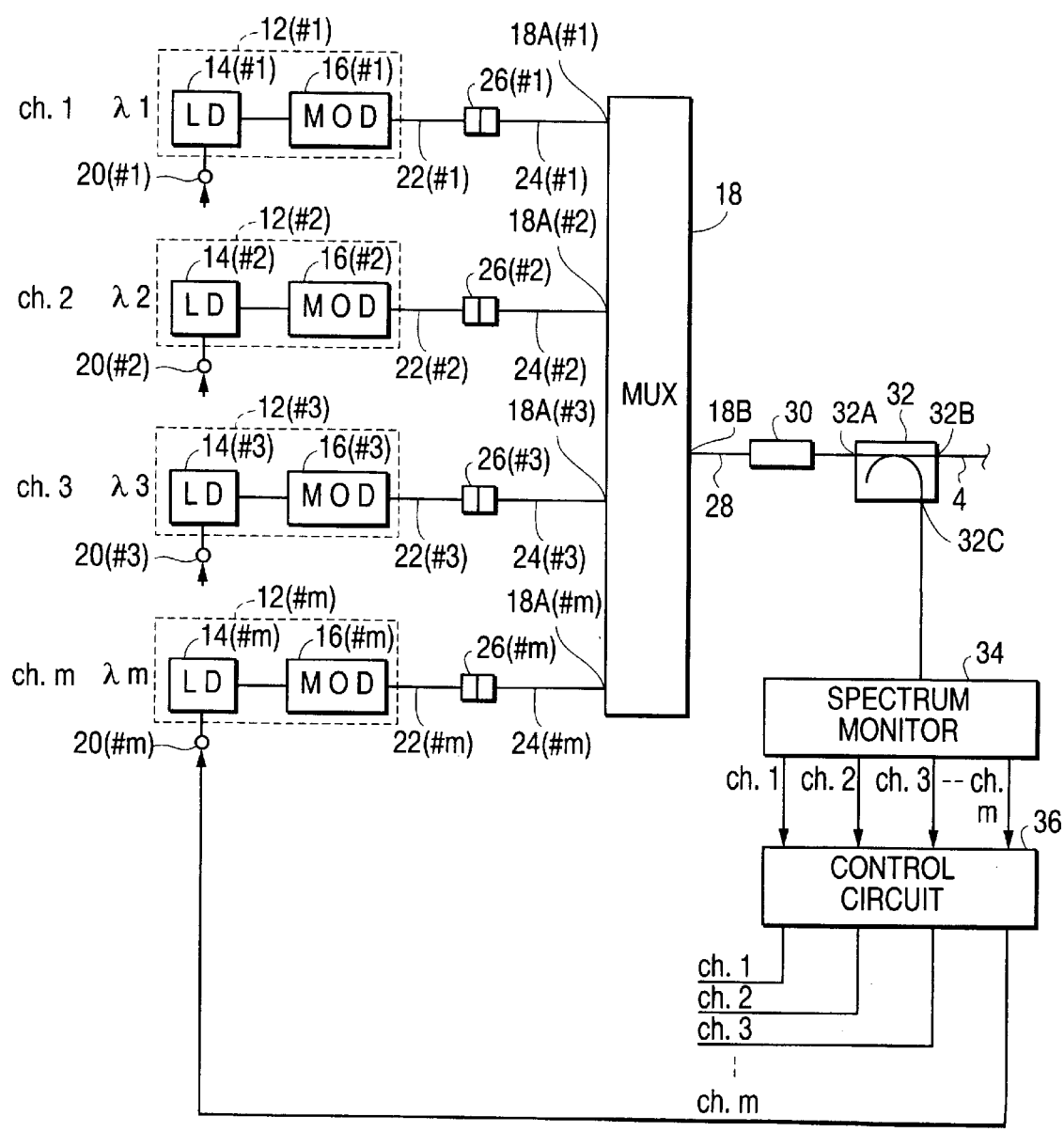
FIG. 5 is a diagram illustrating a transmitting station, according to an embodiment of the present invention.

FIG. 5 is a diagram illustrating a transmitting station, according to an embodiment of the present invention, and which can replace transmitting station 2 in the optical communication system illustrated in FIG. 1. The transmitting station illustrated in FIG. 5 includes optical transmitters 12 (#1 to #m), laser diodes 14 (#1 to #m), optical modulators 16 (#1 to #m) and optical multiplexer 18. Optical connectors 26 (#1 to #m) connect optical transmitters 12 (#1 to #m) to optical multiplexer 18.

To obtain a desired power relativity in the WDM signal light irrespective of variations in losses of the various optical components, the power of carrier light output from the respective laser diode 14 (#1 to #m) in each optical transmitter 12 (#1 to #m) is controlled. For this control, optical transmitters 12 (#1 to #m) have control terminals 20 (#1 to #m), respectively, for controlling bias currents provided to laser diodes 14 (#1 to #m), respectively. Therefore, for example, optical transmitter 12 (#1) has control terminal 20 (#1) to control a bias current provided to laser diode 14 (#1). Laser diode 14 (#1) produces a carrier light having a power determined by the controlled bias current.

The carrier lights from laser diodes 14 (#1 to #m) are modulated by main signals (that is, information signals) in optical modulators 16 (#1 to #m) to obtain modulated signal lights. The modulated signal lights are output from optical modulators 16 (#1 to #m) through optical fibers 22 (#1 to #m), respectively.

Optical multiplexer 18 has a plurality of input ports 18A (#1 to #m) for receiving the signal lights, and at least one output port 18B. Optical fibers 24 (#1 to #m) are connected to input ports 18A (#1 to #m), respectively. Optical fibers 24 (#1 to #m) are detachably connected to optical fibers 22 (#1 to #m) by optical connectors 26 (#1 to #m), respectively.

Optical multiplexer 18 wavelength-division multiplexes the signal lights from the ch. 1 to the ch. m supplied to input ports 18A (#1 to #m), and thereby generates a WDM signal light. The WDM signal light is supplied from output port 18B through an optical fiber 28 to a polarization dependent device 30. Polarization dependent device 30 is, for example, a polarization scrambler or an external modulator.

The WDM signal light output from polarization dependent device 30 is supplied to a port 32A of an optical coupler 32. Optical coupler 32 functions to branch the WDM signal light supplied to port 32A into first and second branched lights at a branching ratio of, for example, 20:1. The first and second branched lights are output from ports 32B and 32C, respectively. In effect, optical coupler 32 decouples a portion of the WDM signal light, the decoupled portion being the second branched light. Optical coupler 32 can be, for example, an optical beam splitter.

Optical fiber transmission line 4 is connected to port 32B. Port 32C is operatively connected to a spectrum monitor 34.

Spectrum monitor 34 receives the decoupled portion of the WDM signal light branched by optical coupler 32, and determines and monitors the spectrum of the received portion. Thus, spectrum monitor 34 can determine and monitor a spectrum in a band which includes the wavelengths $\lambda 1$ to $\lambda m$ of the signal lights.

A control circuit 36 is operatively connected to spectrum monitor 34. Control circuit 36 receives a result of the monitoring by spectrum monitor 34 and produces control signals for all the channels so that the power relativity in the WDM signal light can be maintained constant at the output of the transmitting station. The control signals for controlling channels #1 to #m are supplied to control terminals 20

(#1 to #m), respectively. Therefore, as illustrated in FIG. 5, spectrum monitor 34 and control circuit 36 together form a controller which determines the spectrum of the WDM signal light from a decoupled portion of the WDM signal light, and controls bias currents of laser diodes 14 (#1 to #m) to control the power levels of the individual signal lights of the WDM signal light.

In view of the above, spectrum monitor 34 and control circuit 36 together form a controller which determines the spectrum of the WDM signal light from a decoupled portion of the WDM signal light, and controls the power levels of the individual signal lights of the WDM signal light in accordance with the determined spectrum. More specifically, the relative power levels of the individual signal lights with respect to each other can be controlled.

For example, the power levels of the individual signal lights of the WDM signal light can be controlled to perform preemphasis as illustrated in FIGS. 4(A) and 4(B). In this case, the relative power levels of the individual signal lights are maintained to be constant at the output of the transmitting station. That is, the relative power levels are maintained constant at the output of the transmitting station at the levels indicated, for example, in FIG. 4(A). Therefore, the "relative power" of the WDM signal light would be maintained constant at the output of the transmitting station. Of course, the power relativity would change by the time the WDM signal reaches the receiving station, so that a spectrum as illustrated in FIG. 4(B) is obtained.

Similarly, the power levels of the individual signal lights of the WDM signal light can be controlled to obtain substantially equal signal to noise ratios of the individual signal lights as received by a receiver.

Figure 6:
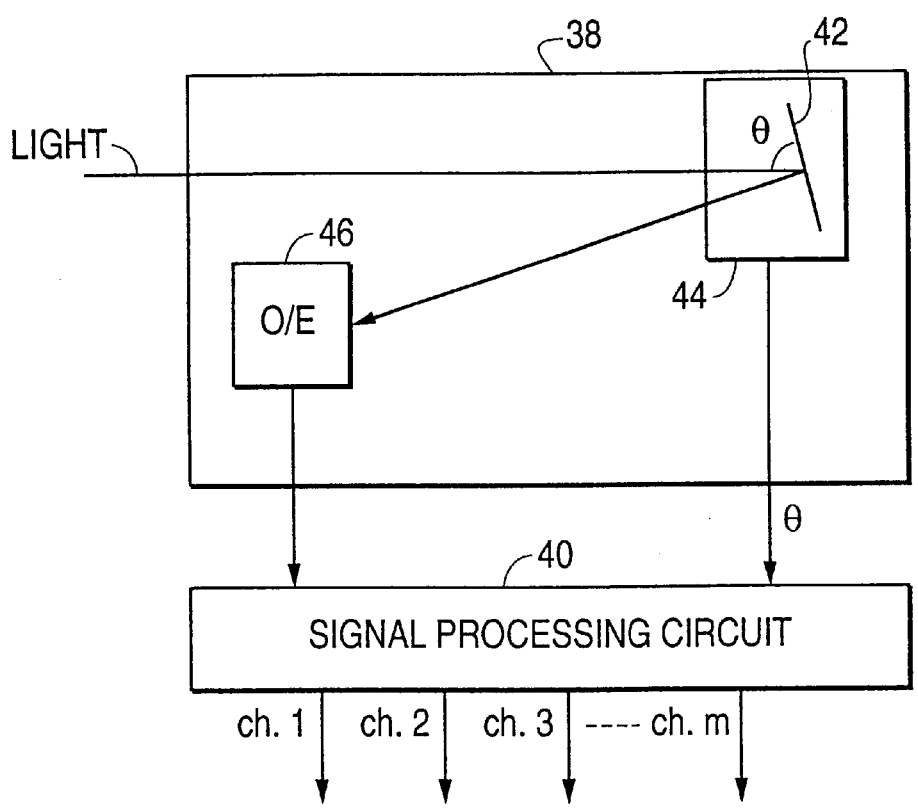
FIG. 6 is a diagram illustrating a spectrum monitor, according to an embodiment of the present invention.

FIG. 6 is a diagram illustrating a spectrum monitor, according to an embodiment of the present invention, and which can be used as spectrum monitor 34 shown in FIG. 5. Referring now to FIG. 6, the spectrum monitor includes a body 38 having mechanical moving parts therein. More specifically, body 38 includes a dispersing device, such as diffraction grating 42, for receiving light at angle θ. Diffraction grating 42 diffracts the received light at a specific angle in accordance with the wavelength of the received light. Body 38 also includes an O/E converter 46, such as a photodetector, for opto-electric converting light diffracted from diffraction grating 42.

Body 38 also includes a signal processing circuit 40 which receives an output signal from O/E converter 46. A signal relating to the incident angle θ, from a scanner 44, is also supplied to signal processing circuit 40.

The wavelength of light diffracted to O/E converter 46 depends on the incident angle θ of light on diffraction grating 42. Therefore, the spectrum of the light received by the spectrum monitor can be obtained by detecting an output level from O/E converter 46 according to the incident angle θ scanned. Signal processing circuit 40 then detects spectrum peak values of signal lights in all the channels of the WDM signal light.

Figure 7:
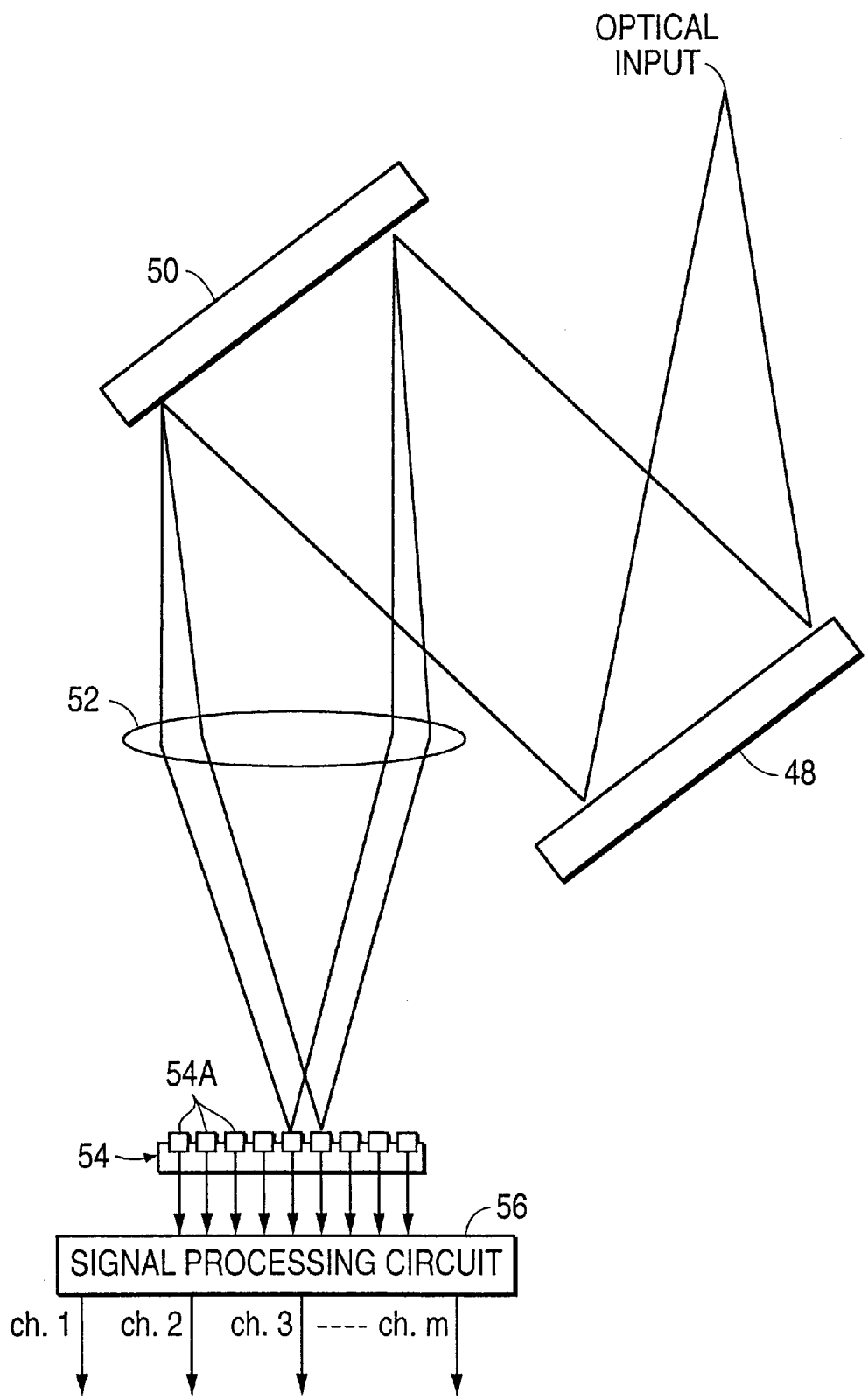
FIG. 7 is a diagram illustrating a spectrum monitor, according to an additional embodiment of the present invention.

FIG. 7 is a diagram illustrating a spectrum monitor, according to an additional embodiment of the present invention, and which can be used as spectrum monitor 34 shown in FIG. 5. Referring now to FIG. 7, an input light (that is, for example, the portion of light decoupled from the WDM signal light by optical coupler 32 in FIG. 5) is collimated by a concave mirror 48, and then supplied to a light dispersing device 50. Light dispersing device 50 disperses received light into a plurality of disbursed lights travelling, respectively, in a plurality of directions depending on wavelength. To eliminate the need for scanning, the spectrum monitor employs a photodetecting array 54 having a plurality of opto-electric conversion elements 54A located so as to receive the lights dispersed by light dispersing device 50. The dispersed light is converged by a lens 52 to enter elements 54A at specific positions corresponding to wavelengths.

The propagation direction of the dispersed light changes, for example, on a plane parallel to the sheet plane of FIG. 7, according to wavelength. Therefore, for example, by setting the direction of arrangement of elements 54A to a direction parallel to the sheet plane of FIG. 7, a plurality of signals for obtaining the spectrum of the optical input are output from photodetecting array 54. Examples of photodetecting array 54 include, for example, a PIN photodiode array and a CCD (charge-coupled device) sensor using a material sensitive to light in a wavelength band of 1.3 to 1.5 $\mu$m typically used in optical communication.

A signal processing circuit 56 receives the signals from photodetecting array 54 and detects spectrum peak values of signal lights in all the channels of the WDM signal light.

In the case that a diffraction grating is used as light dispersing device 50, the angular dispersion of light dispersing device 50 becomes about 0.04 degree/nm, and the pitch of elements 54A of photodetecting array 54 can be set to about tens of micrometers. Accordingly, by properly designing the distance between the components, a spectrum monitor having a resolution of about 0.1 nm can be obtained.

Letting W denote the pitch of elements 54A of photodetecting array 54, L denote the distance between photodetecting array 54 and light dispersing device 50, D denote the angular dispersion of light dispersing device 50, and ø denote the angle of view from light dispersing device 50 to any two adjacent ones of elements 54A, a wavelength resolution is given by the following equation.

$$2\text{ø}/D=2\tan^{-1}(W/2/L)/D$$

For example, in the case of W=50 $\mu$m, L=10 cm, and D=0.04 degree/nm, a resolution of 0.072 nm can be obtained.

According to the above embodiments of the present invention, a spectrum monitor uses a dispersing device which receives light and disperses the received light into a plurality of different lights travelling, respectively, in a plurality of different directions. For example, see light dispersing device 50 in FIG. 7. Many different optical devices can be used as a light dispersing device. For example, a diffraction grating or a Virtually-Imaged Phased-Array (VIPA) can be used as a light dispersing device. A VIPA is disclosed, for example, in U.S. application titled "VIRTUALLY IMAGED PHASED ARRAY AS A WAVE-LENGTH DEMULTIPLEXER", U.S. Ser. No. 08/685,362, filed on Jul. 24, 1996, now U.S. Pat. No. 5,999,320 and which is incorporated herein by reference. The angular dispersion of such a VIPA is 0.4 to 0.8 degree/nm. Accordingly, the use of a VIPA allows a great improvement in wavelength resolution.

Although signal processing circuit 40 (see FIG. 6) and signal processing circuit 56 (see FIG. 7) output a plurality of channels of signals, the signals in all the channels may be collected in a single channel, and may be output, for example, as digital data.

Referring again to FIG. 5, it is assumed that the transmitting station becomes large in scale, so that optical connectors 26 (#1 to #m) are used to connect optical transmitters 12 (#1 to #m) to optical multiplexer 18. Accordingly, even if the powers of signal lights to be output from optical transmitters 12 (#1 to #m) are equal to each other, the spectrum peak values in all the channels of WDM signal light to be output from optical multiplexer 18 are varied by variations in connection loss of optical connectors 26 (#1 to #m). Further, variations in insertion loss of optical modulators 16 (#1 to #m) in optical transmitters 12 (#1 to #m) also cause variations in spectrum peak values.

Figure 8A:
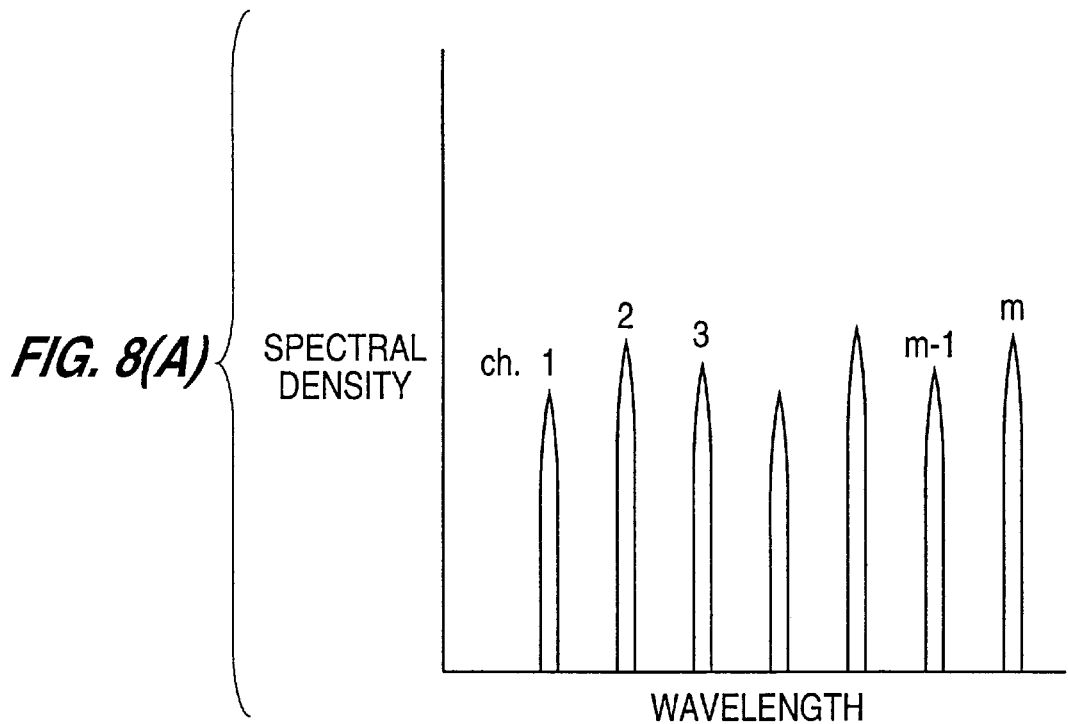
FIGS. 8(A) and 8(B) are graphs illustrating the operation of a control circuit of an optical communication system, according to an embodiment of the present invention.
Figure 8B:
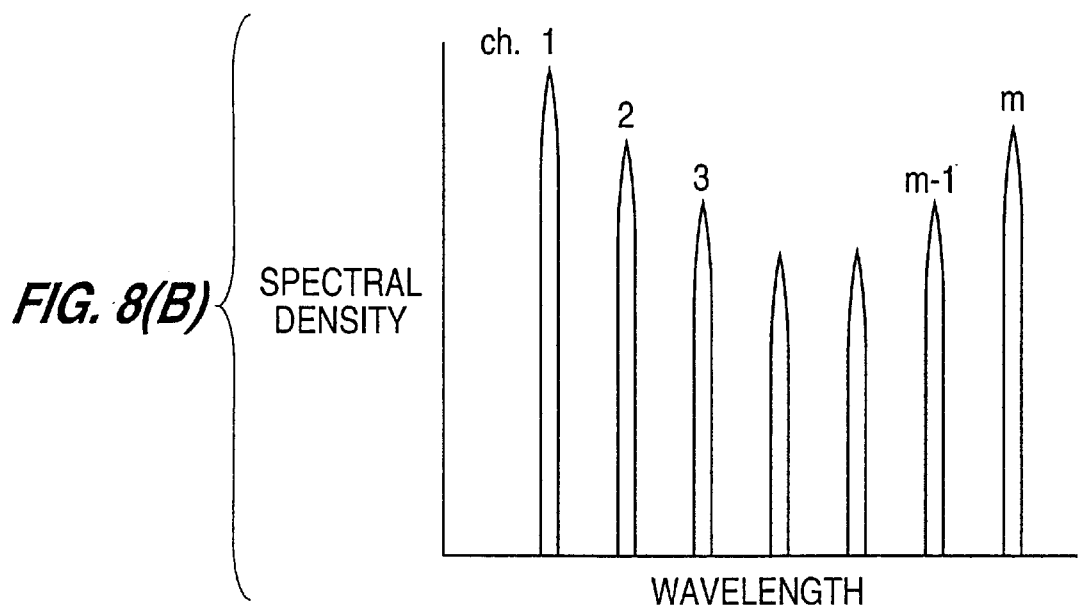

FIGS. 8(A) and 8(B) are graphs illustrating the operation of control circuit 36 in FIG. 5, according to an embodiment of the present invention. More specifically, FIG. 8(A) illustrates a spectrum of WDM signal light with the spectrum peak values in all the channels varied by the above-mentioned causes. The spectrum peak values in all the channels are sent from spectrum monitor 34 to control circuit 36. The spectrum peak values in all the channels are fed back to control the bias currents for laser diodes 14 (#1 to #m), so as to obtain a spectrum as shown in FIG. 8(B). Therefore, preemphasis is performed as in FIG. 4(A). Such a feedback loop can be easily configured by using an operational amplifier and a variable reference voltage source.

In the present embodiment of the present invention, polarization dependent device 30 is inserted in optical transmission line 4, and the optical wiring between each optical transmitter 12 (#1 to #m) and polarization dependent device 30 preferably uses polarization maintaining fibers. That is, optical fibers 22 (#1 to #m), optical fibers 24 (#2 to #m) and optical fiber 28 are preferably polarization maintaining fibers. In connecting optical fibers 22 (#1 to #m) and optical fibers 24 (#1 to #m) through optical connector 26 (#1 to #m) in each channel, the rotational positions of optical connectors 26 (#1 to #m) are adjusted so that the principal axes of optical fibers 22 (#1 to #m) and optical fibers 24 (#1 to #m) come to coincidence. Accordingly, variations in such adjustment of optical connectors 26 (#1 to #m) in all the channels also cause a change in power relativity in WDM signal light to be output from optical multiplexer 18. A desired power relativity in WDM signal light can be obtained by operating control circuit 36 after finishing the adjustment of optical connectors 26 (#1 to #m) and, for example, preemphasis can be accurately performed.

Figure 9:
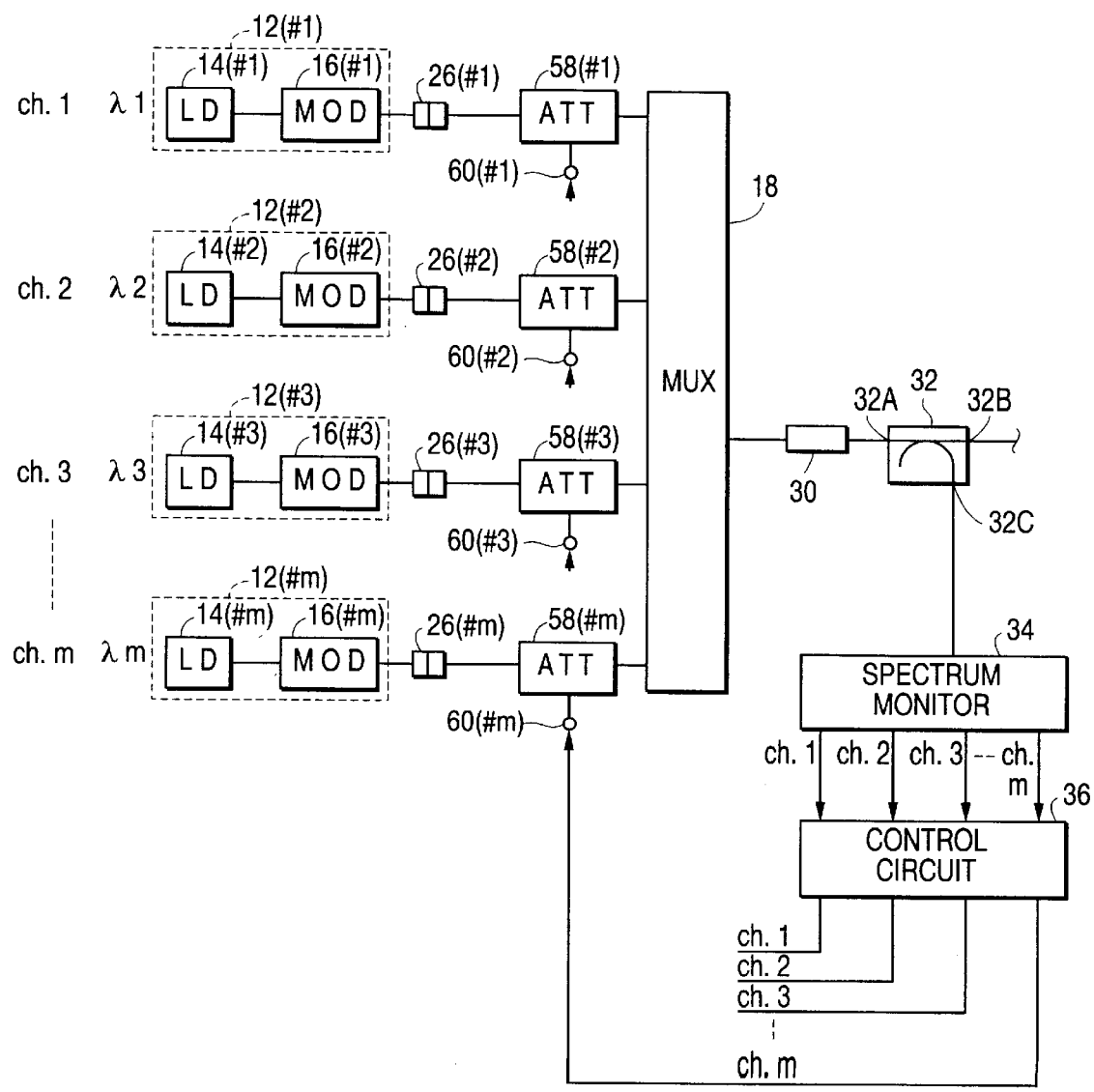
FIG. 9 is a diagram illustrating a transmitting station, according to an embodiment of the present invention.

FIG. 9 is a diagram illustrating a transmitting station, according to a further embodiment of the present invention, and which can replace transmitting station 2 in the optical communication system illustrated in FIG. 1. Referring to FIG. 9, signal lights output from optical transmitters 12 (#1 to #m) are supplied through optical attenuators 58 (#1 to #m), respectively, to optical multiplexer 18.

Optical attenuators 58 (#1 to #m) each have a variable attenuation controlled by control circuit 36. To obtain a desired power relativity in the WDM signal light, the attenuation of each attenuator 58 (#1 to #m), rather than the bias current for laser diodes 14 (#1 to #m), is controlled.

Therefore, as illustrated in FIG. 9, spectrum monitor 34 and control circuit 36 together from a controller which controls the attenuation of attenuators 58 (#1 to #m) to control the power levels of individual signal lights of the WDM signal light.

Optical attenuators having a variable attenuation are known, and may be constructed, for example, of a magneto-optic crystal transmitting a signal lights. Such an optical attenuator can also be constructed, for example, by applying an adjustable magnetic field to a magneto-optic crystal so that the magneto-optic crystal has optical rotating power, with a polarizer transmitting light from the magneto-optic crystal. The power of light output from the polarizer is determined by an optical rotating angle in the magneto-optic crystal. Accordingly, the attenuation can be changed by adjusting the magnetic field to be applied. In this case, control circuit 36 would control the applied magnetic field, to control the attenuation. A variable optical attenuator is disclosed, for example, in U.S. application titled "FARADAY ROTATOR WHICH GENERATES A UNIFORM MAGNETIC FIELD IN A MAGNETIC OPTICAL ELEMENT", U.S. Ser. No. 08/704,946, filed on Aug. 29, 1996, now U.S. Pat. No. 5,812,304 and which is incorporated herein by reference.

Figure 10:
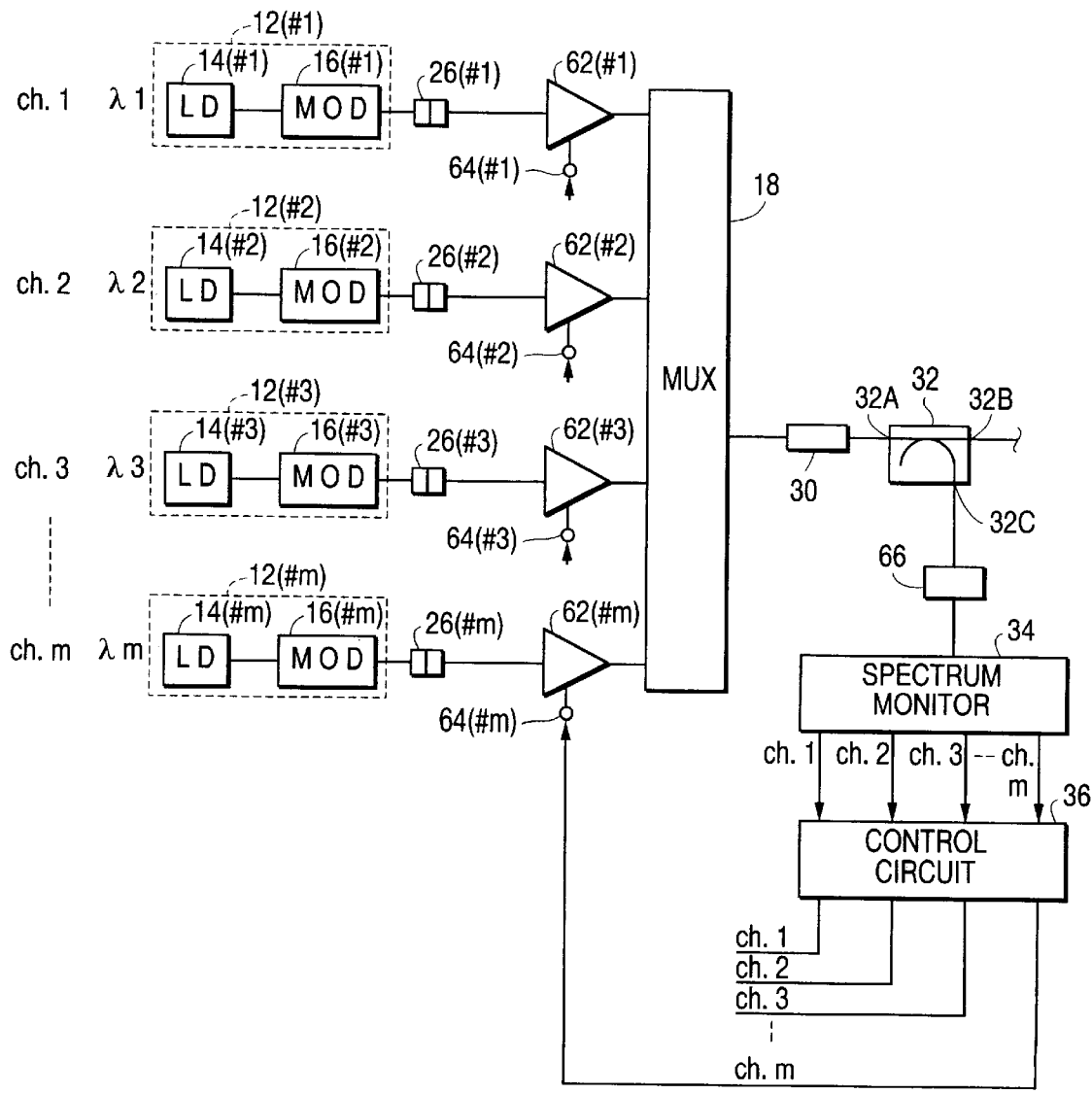
FIG. 10 is a diagram illustrating a transmitting station, according to an additional embodiment of the present invention.

FIG. 10 is a diagram illustrating a transmitting station, according to an additional embodiment of the present invention, and which can replace transmitting station 2 in the optical communication system illustrated in FIG. 1. Referring now to FIG. 10, optical amplifiers 62 (#1 to #m) are substituted, respectively, for optical attenuators 58 (#1 to #m) shown in FIG. 9.

Optical amplifiers 62 (#1 to #m) have variable gains. Moreover, optical amplifiers 62 (#1 to #m) have control terminals 64 (#1 to #m) for changing the gains, respectively. Control signals from control circuit 36 are supplied to control terminals 64 (#1 to #m). The gains of optical amplifiers 62 (#1 to #m) in all the channels are controlled so that a desired power relativity in WDM signal light is obtained. A polarization scrambler 66 is provided between optical coupler 32 and spectrum monitor 34, to eliminate control error due to polarization dependence of optical coupler 32 and/or spectrum monitor 34.

Therefore, as illustrated in FIG. 10, spectrum monitor 34 and control circuit 36 together from a controller which controls the gains of optical amplifiers 62 (#1 to #m) to control the power levels of individual signal lights of the WDM signal light.

Figure 11:
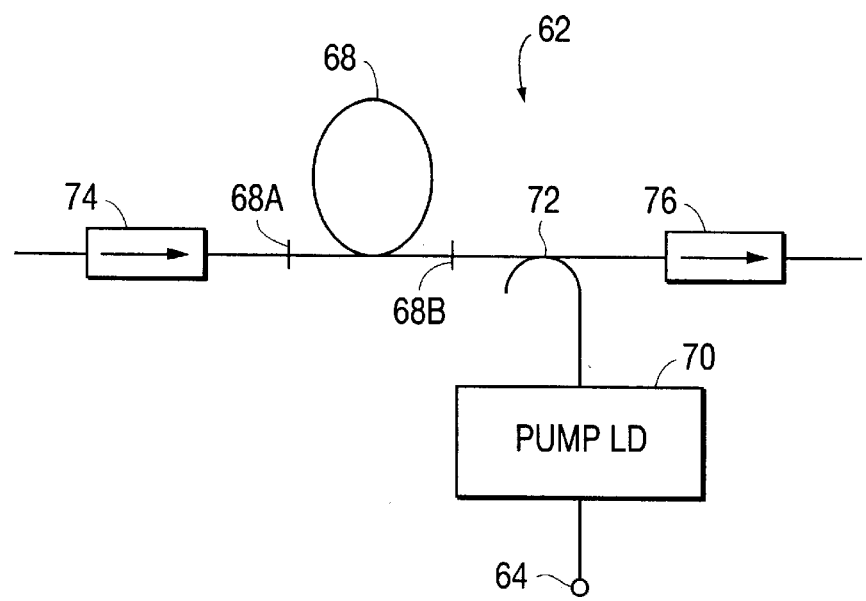
FIG. 11 is a diagram illustrating an optical amplifier, according to an embodiment of the present invention.

FIG. 11 is a diagram illustrating an optical amplifier, according to an embodiment of the present invention. More specifically, FIG. 11 illustrates an optical amplifier that can be used as each optical amplifier 62 shown in FIG. 10.

Referring now to FIG. 11, the optical amplifier includes a doped fiber 68 having a first end 68A and a second end 68B, a pump laser diode (pump LD) 70 which produces pump light, and an optical coupler 72 which supplies the pump light from second end 68B into doped fiber 68. In the case that the wavelengths of the WDM signal light to be amplified fall within, for example, a 1.55 $\mu$m band which is typically used in optical communication systems, Er (erbium) is suitable for the dopant of doped fiber 68. In this case, the wavelength of the pump light should be set, for example, to fall preferably within a 0.98 $\mu$m band or a 1.48 $\mu$m band. When WDM signal light passed through an optical isolator 74 is supplied from the first end 68A into doped fiber 68 being pumped by the pump light, the WDM signal light is amplified in doped fiber 68. The WDM signal light thus amplified is passed through optical coupler 72 and an optical isolator 76, and is then output from the optical amplifier.

The gain of the optical amplifier depends on the power of the pump light output from pump LD 70. Accordingly, a bias current for pump LD 70 is preferably adjusted by a control signal input to a control terminal 64. Therefore, as illustrated by FIGS. 10 and 11, spectrum monitor 34 and control circuit 36 together from a controller which controls the pump light produced by optical amplifiers 62 (#1 to #m) to control the power levels of individual signal lights of the WDM signal light.

A WDM coupler having a coupling ratio dependent on wavelength may be used as optical coupler 72. Moreover, optical coupler 72 is connected to second end 68B of doped fiber 68, so that the WDM signal light and the pump light propagate in opposite directions in doped fiber 68. That is, backward pumping is adopted. Alternatively, forward pumping may be adopted in such a manner that a pump light source is operatively connected to first end 68A of doped fiber 68, so that WDM signal light and pump light propagate in the same direction in doped fiber 68. Further, bidirectional pumping may be adopted by using two pump light sources. Optical amplifiers having a variable gain dependent on the power of pump light are known. Also, many configurations for forward, backward and bidirectional pumping of an optical amplifier are known.

Figure 12:
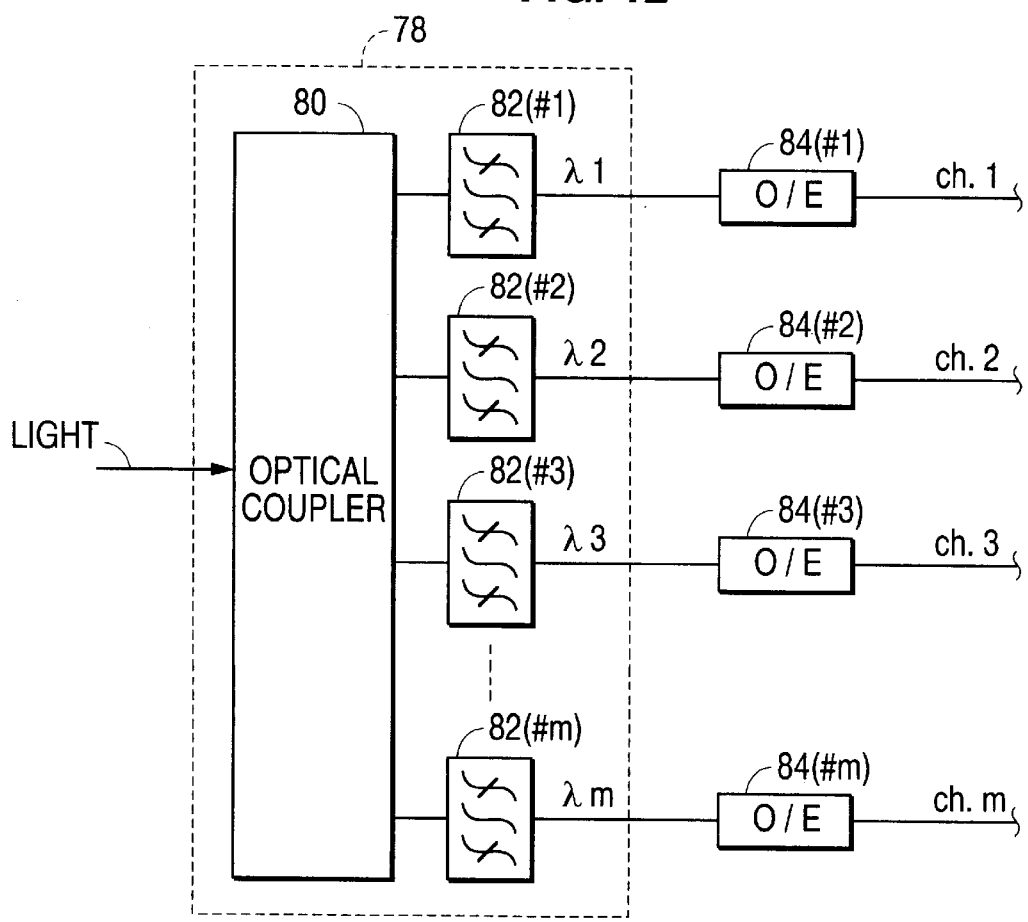
FIG. 12 is a diagram illustrating a spectrum monitor, according to an embodiment of the present invention.

FIG. 12 is a diagram illustrating a spectrum monitor, according to an embodiment of the present invention, and which may be used as spectrum monitor 34 shown in FIG. 5. Referring now to FIG. 12, the spectrum monitor includes an optical demultiplexer 78 for receiving WDM signal light to extract a plurality of light components having the wavelengths λ1 to λm of signal lights in all the channels of the WDM signal light, and O/E converters 84 (#1 to #m) for opto-electric converting the plurality of light components.

Optical demultiplexer 78 includes, for example, a 1×m optical coupler 80 and optical band-pass filters 82 (#1 to #m) connected between optical coupler 80 and O/E converters 94 (#1 to #m). The center wavelengths in the pass bands of optical band-pass filters 82 (#1 to #m) are set to λ1 to λm, respectively.

With the spectrum monitor illustrated in FIG. 12, it is possible to obtain output signals from O/E converters 84 (#1 to #m) corresponding to the powers at the spectrum peaks in all the channels shown, for example, in FIG. 8(A). Therefore, a desired power relativity in the WDM signal light can be obtained according to these output signals.

Optical demultiplexer 78 is reverse in function to optical multiplexer 18 (see FIG. 5), so that the same optical multiplexer may be used in common. Such an optical multiplexer (demultiplexer) is known. For example, a suitable, known optical multiplexer is constructed of a diffraction grating, lens, and waveguide concentrator (for example, see General Meeting of Electronic Information Communications Institute, B-1102, 1995). Another suitable, known optical multiplexer is constructed of an array waveguide diffraction grating (AWG) (for example, see Electronics Society Meeting of Electronic Information Communications Institute, C-227, 1995).

Figure 13:
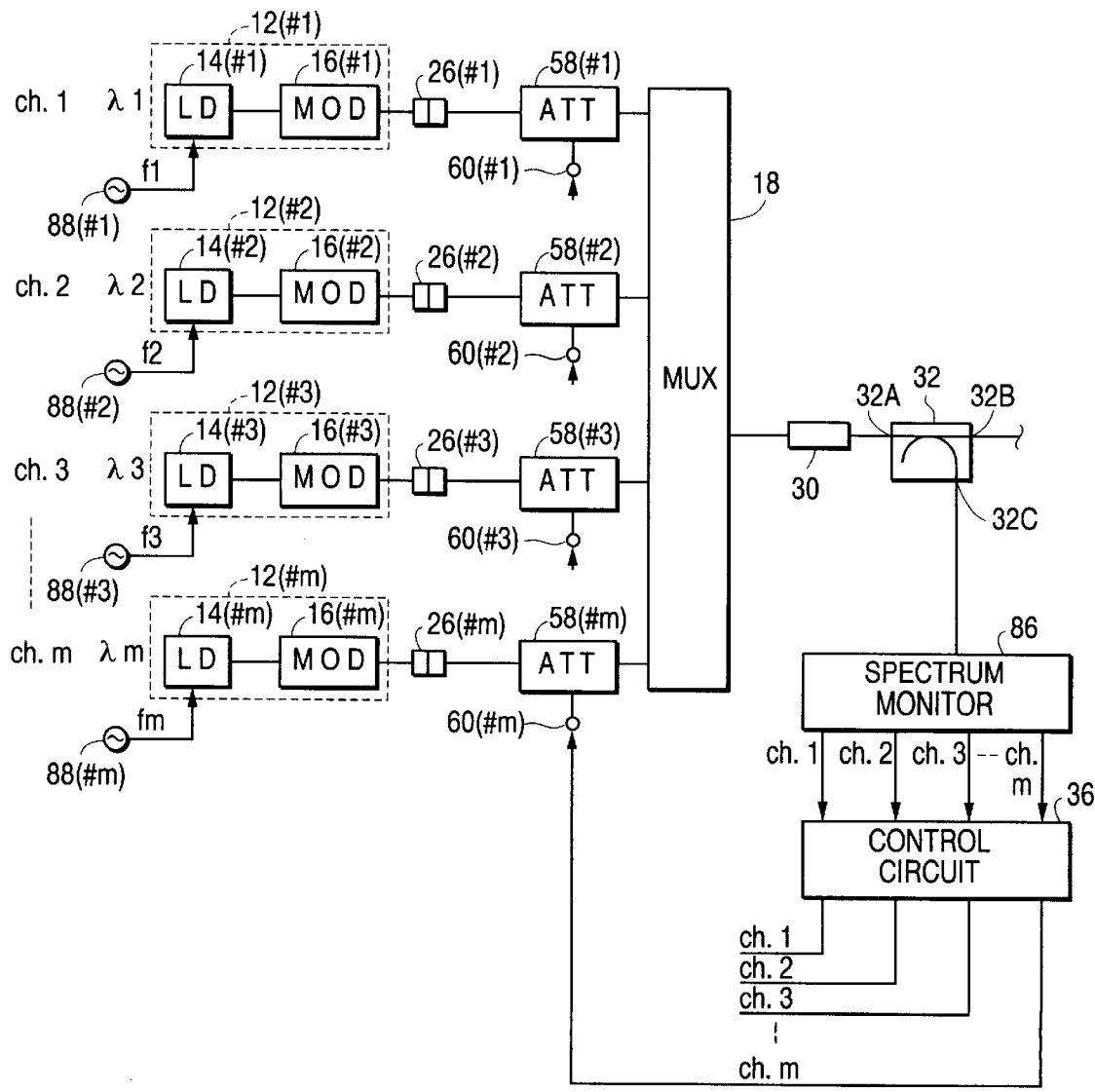
FIG. 13 is a diagram illustrating a transmitting station, according to a further embodiment of the present invention.

FIG. 13 is a diagram illustrating a transmitting station, according to a further embodiment of the present invention, and which can replace transmitting station 2 in the optical communication system illustrated in FIG. 1. Referring now to FIG. 13, a special spectrum monitor 86 having relatively simple optical components is substituted for the above-described spectrum monitor 34. Moreover, optical transmitters 12 (#1 to #m) are respectively provided with oscillators 88 (#1 to #m) for modulating signal lights to be output from optical transmitters 12 (#1 to #m) by tone signals having different frequencies f1 to fm.

Optical modulators 16 (#1 to #m) modulate the carrier lights produced by laser diodes 14 (#1 to #m) with main signals (that is, information signals). The frequencies f1 to fm of the tone signals are set to be sufficiently lower than the frequencies of the main signals, so as to avoid an adverse effect on modulation of carrier light by the main signals in optical modulators 16 (#1 to #m).

Bias currents for laser diodes 14 (#l to #m) are modulated by the tone signals having the frequencies f1 to fm, respectively. However, optical modulators for the tone signals different from the optical modulators 16 for the main signals may be added, or the tone signals may be superimposed on the main signals to be supplied to optical modulators 16. Thus, the tone components are "combined" with light signals either by optical modulators or by being superimposed on main signals. Therefore, an optical modulator, or a device for superimposing the tone components, can be referred to as a "combiner".

Figure 14:
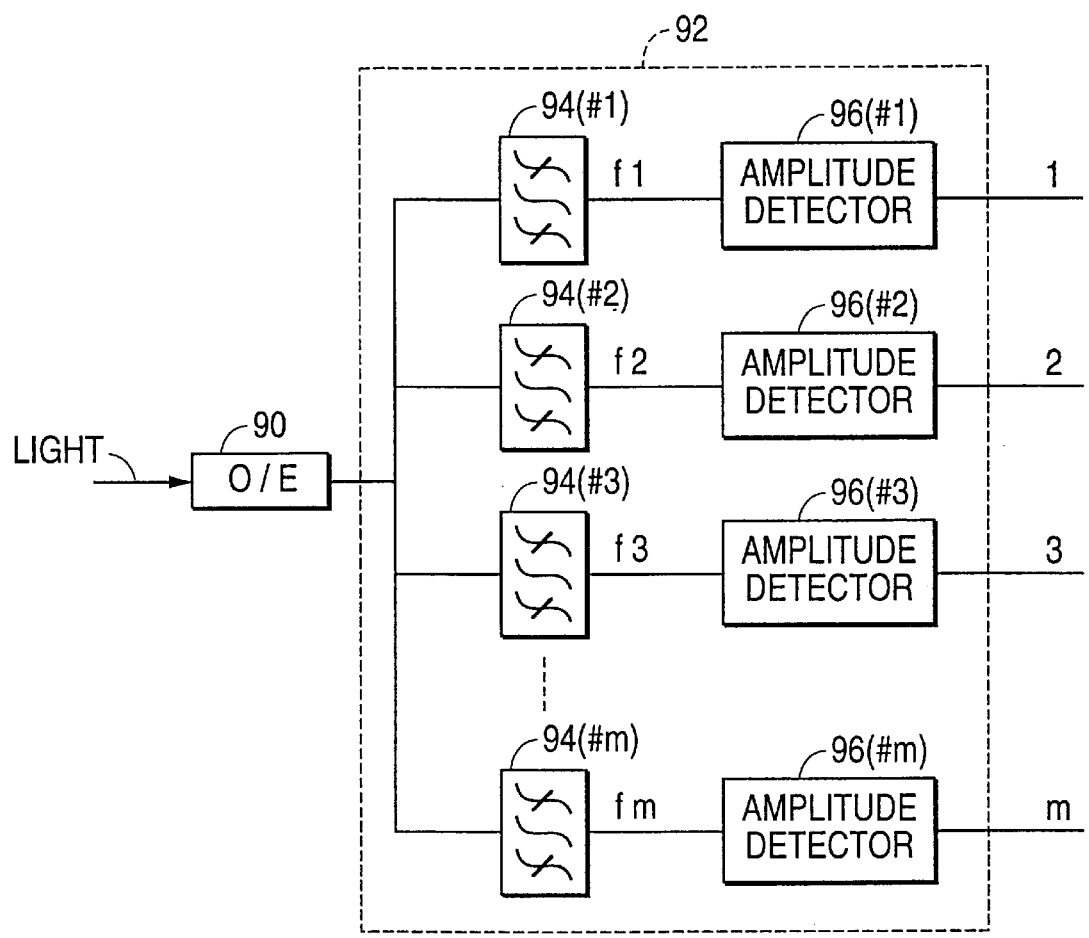
FIG. 14 is a diagram illustrating a spectrum monitor, according to an embodiment of the present invention.

FIG. 14 is a diagram illustrating a spectrum monitor, according to an embodiment of the present invention, and which may be used as spectrum monitor 86 shown in FIG. 13. Referring now to FIG. 14, the spectrum monitor includes an O/E converter 90 for opto-electric converting received WDM signal light, and a detecting circuit 92 for extracting frequency components of tone signals from an output signal from O/E converter 90.

Detecting circuit 92 has band-pass filters 94 (#1 to #m) for receiving the output signal from O/E converter 90 and amplitude detectors 96 (#1 to #m) provided after the band-pass filters 94 (#1 to #m), respectively. The center frequencies of the pass bands of band-pass filters 94 (#1 to #m) are set to the frequencies f1 to fm, respectively, of the tone signals in all the channels.

The value of the spectrum peak in a specific channel of the WDM signal light is proportional to the amplitude of a superimposed tone component. Accordingly, a desired power relativity in the WDM signal light can be obtained by operating a control circuit 36 (see FIG. 13) according to the output signals in all the channels from detecting circuit 92.

Therefore, spectrum monitor 86 and control circuit 36 together form a controller which determines the amplitude of each tone components from a decoupled portion of the WDM signal light, and determines the spectrum of the WDM signal light from the determined amplitudes. The controller then controls the power levels of the individual signal lights of the WDM signal in accordance with the determined spectrum.

The detecting circuit 92 may be replaced by a known synchronous detecting circuit. In this case, the output signal from O/E converter 90 is supplied to m mixers (not illustrated) Reference signals to be supplied to the mixers may be identical to the tone signals from oscillators 88 (#1 to #m) shown in FIG. 13.

Although optical modulators 16 are used for modulation by the main signals in the above embodiments of the present invention, direct modulation of laser diodes 14 (#1 to #m), rather than modulation in optical modulators 16, may be adopted.

Figure 15:
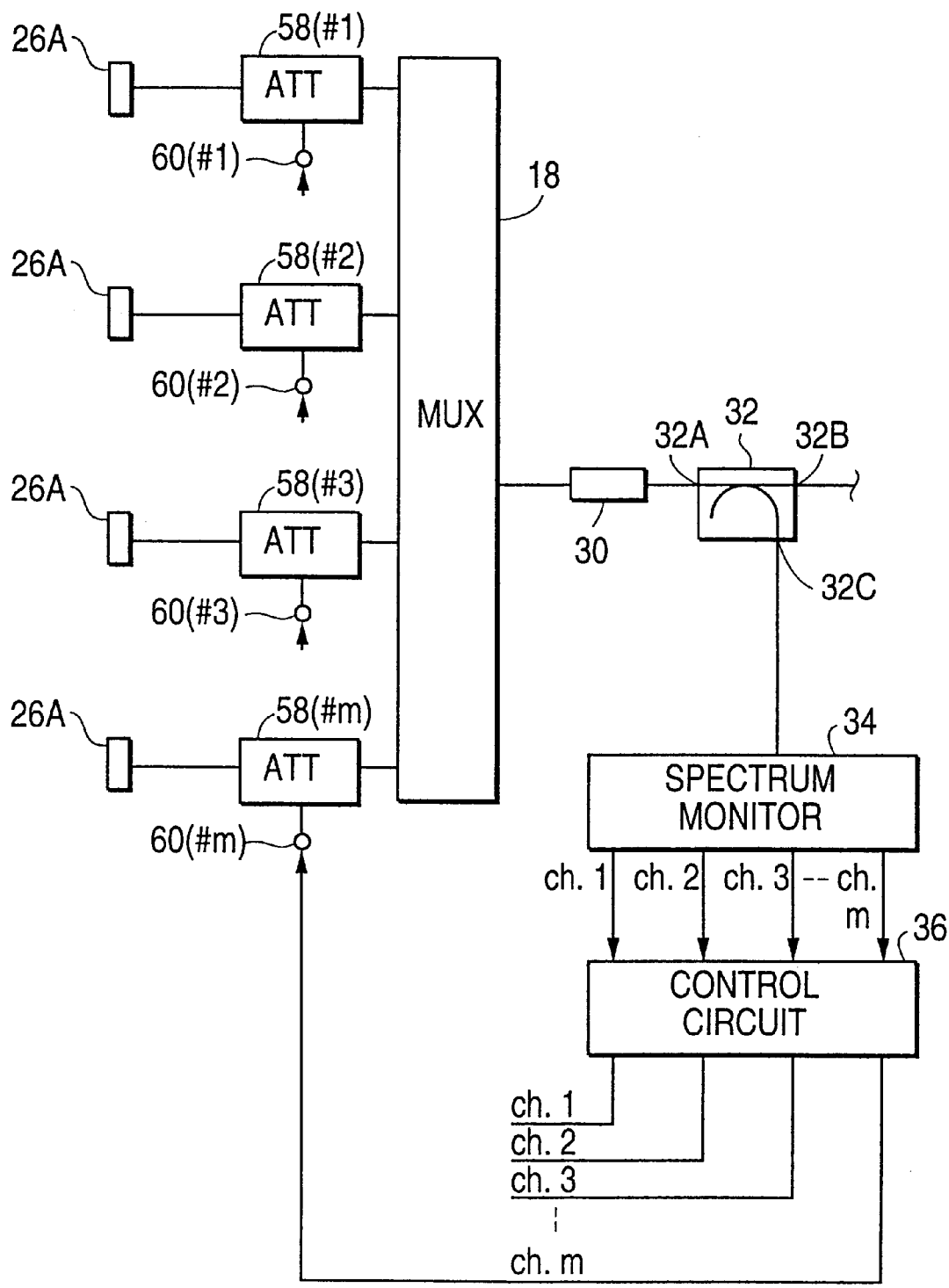
FIG. 15 is a diagram illustrating an optical power control device, according to an embodiment of the present invention.

FIG. 15 is a diagram illustrating an optical power control device, according to an embodiment of the present invention. More specifically, FIG. 15 corresponds to a configuration obtained by removing optical transmitters 12 (#1 to #m) from the configuration shown in FIG. 9.

Figure 16:
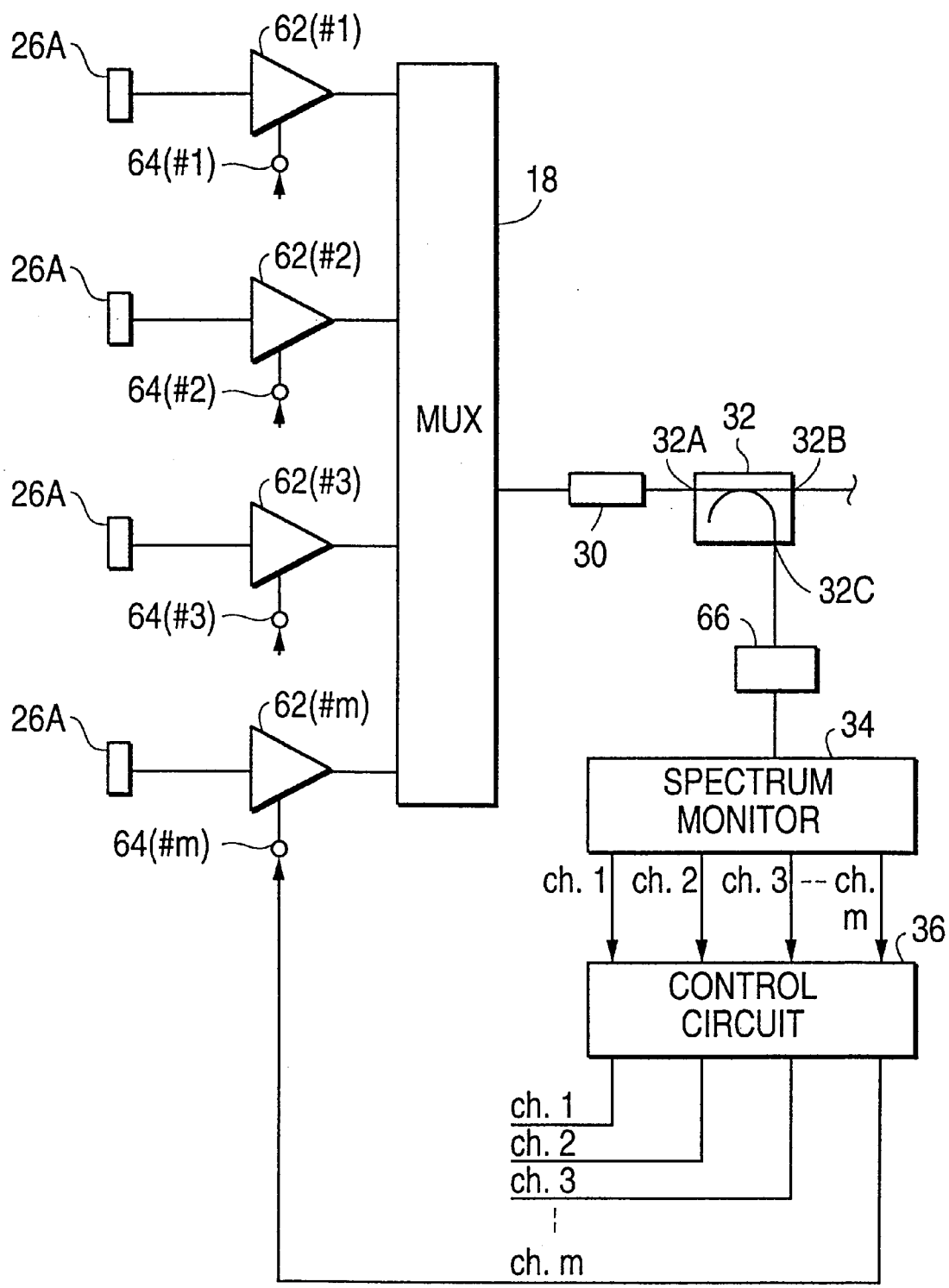
FIG. 16 is a diagram illustrating an optical power control device, according to an additional embodiment of the present invention.

FIG. 16 is a diagram illustrating an optical power control device, according to an additional embodiment of the present invention. More specifically, FIG. 16 corresponds to a configuration obtained by removing optical transmitters 12 (#1 to #m) from the configuration shown in FIG. 10.

In FIGS. 15 and 16, reference numerals 26A denote half members of optical connectors 26 (#1 to #m) (see FIGS. 9 and 10). In the case that the transmitting station is large in scale, the optical transmitters are located at different positions (e.g., on different shelves in a certain rack or in different racks). Therefore, an optical power control device, as illustrated in FIGS. 15 and 16, is useful. An optical power control device, as illustrated in FIGS. 15 and 16, operates in a similar manner as above-described embodiments of the present invention. Therefore, a repeat description will not be presented here.

Figure 17:
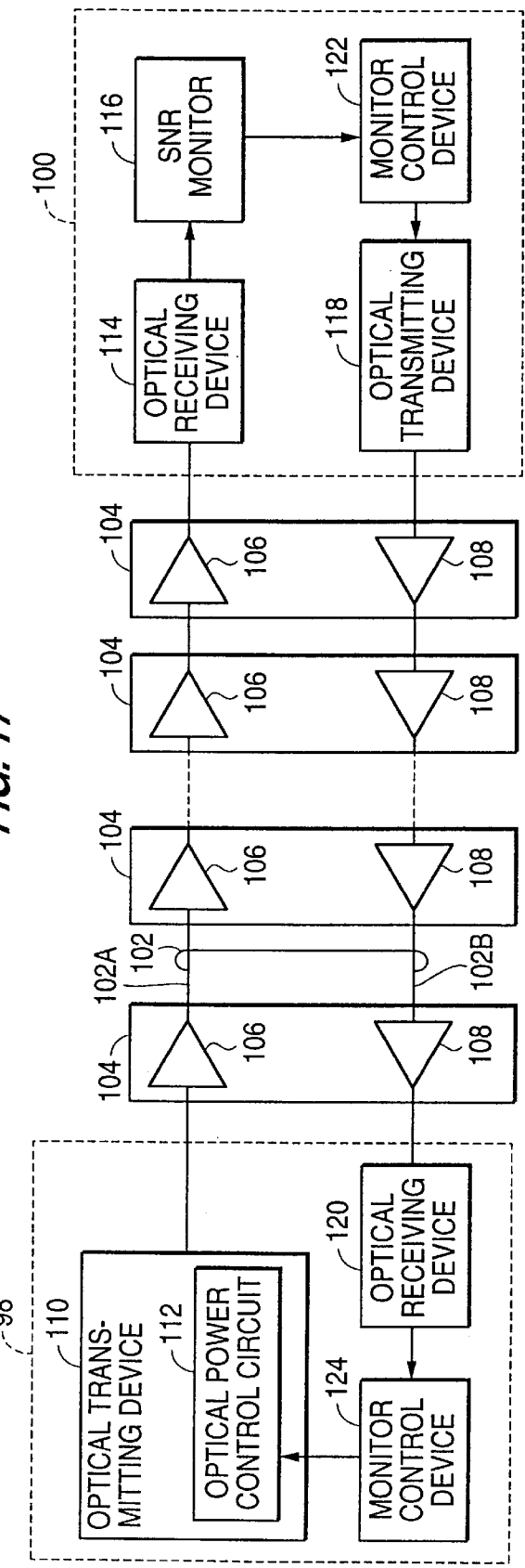
FIG. 17 is a diagram illustrating an optical communication system, according to an embodiment of the present invention.

FIG. 17 is a diagram illustrating an optical communication system, according to an embodiment of the present invention. Referring now to FIG. 17, a first terminal station 98 is connected to a second terminal station 100 via an optical transmission line 102. Optical transmission line unit 102 includes separate lines 102A and 102B laid between terminal stations 98 and 100. A plurality of optical repeaters 104 are provided along optical transmission line 102. Each optical repeater 104 has an optical amplifier 106 adapted to line 102A and an optical amplifier 108 adapted to line 102B.

Figure 2:
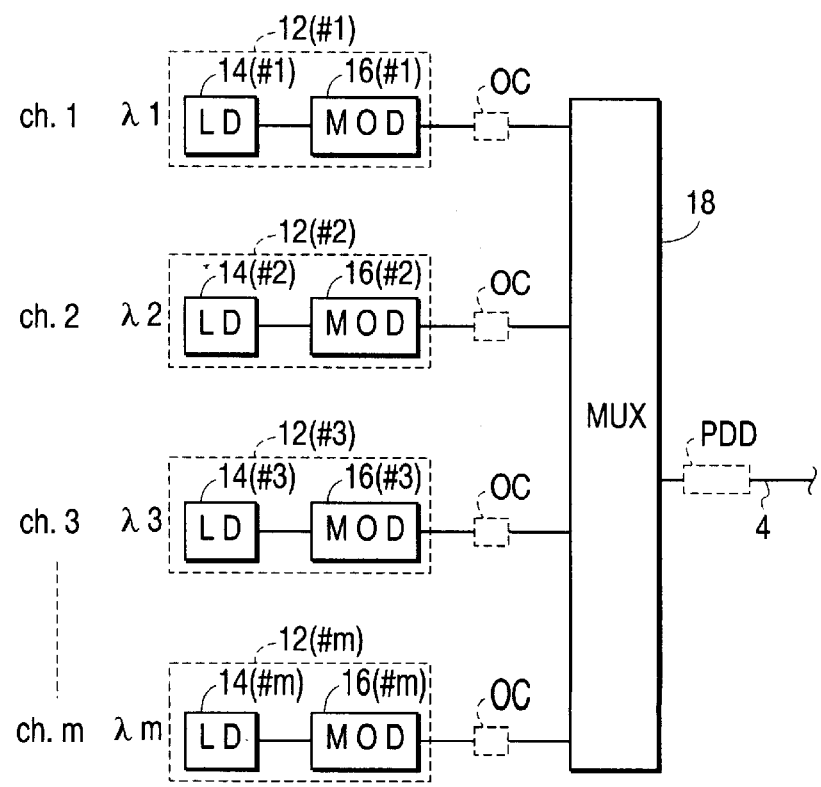
FIG. 2 (prior art) is a diagram illustrating a conventional transmitting station of the optical communication system illustrated in FIG. 1.

First terminal station 98 has an optical transmitting device 110 which outputs a WDM signal light. Optical transmitting device 110 has a configuration, for example, as shown in FIG. 2, but also includes an optical power control circuit 112. Optical power control circuit 112 controls power relativity in the WDM signal light to be output from optical transmitting device 110. For example, optical power control circuit 112 is configured to include the optical attenuators 58 shown in FIG. 9, or the optical amplifiers 62 shown in FIG. 10. Alternatively, the power of a light source in each channel may be controlled without an optical attenuator or an optical amplifier.

The WDM signal light output from optical transmitting device 110 is sent through line 102A and optical amplifiers 106 to second terminal station 100. Second terminal station 100 includes an optical receiving device 114 for receiving the WDM signal light. An electrical SNR monitor 116 is connected to optical receiving device 114, to measure an electrical SNR corresponding to an optical SNR in each channel of the WDM signal light. A commercially available Q-factor (quality factor) monitor may be used as electrical SNR monitor 116. A monitor control device 122 generates a monitor signal indicating the SNR measured by electrical SNR monitor 116. The monitor signal is superimposed, for example, on a signal light (preferably, a WDM signal light, but not limited thereto) by an optical transmitting device 118.

Optical transmitting device 118 sends the signal light with the superimposed monitor signal to first terminal station 98 through line 102B and optical amplifiers 108. First terminal station 98 includes an optical receiving device 120 which receives the signal light from second terminal station 100, and a monitor control device 124 which reproduces the monitor signal in accordance with the signal received by optical receiving device 120. Then, optical power control circuit 112 controls the power relativity in the WDM signal light according to the signal reproduced by control device 124.

Monitor control device 124 and optical power control circuit 112 perform preemphasis in optical transmitting device 110 so that SNRs in all the channels of the WDM signal light received by second terminal station 100 are equalized. Such preemphasis is especially effective in the case that each optical amplifier 106 is an EDFA.

Therefore, SNR monitor 116, monitor control device 122, optical transmitting device 118, optical receiving device 120, monitor control device 124 and optical power control circuit 112 together form a controller which controls the power levels of individual signal lights in the WDM signal light to obtain substantially equal signal to noise ratios of the individual signal lights at second terminal station 100.

In general, first terminal station 98 and second terminal station 100 are located at remote sites, so that the system illustrated in FIG. 17 is highly effective for smoothing the adjustment in preemphasis, or similar such procedures. That is, the WDM signal light from optical transmitting device 110 is sent through transmitting line 102A to second terminal station 100, and information on SNR degradation revealed as the result is transferred through the other line 102B to first terminal station 98. Accordingly, preemphasis can be easily performed in first terminal station 98.

A computer may be applied to monitor control device 124 in terminal station 98, thereby allowing automated preemphasis. In this case, the computer calculates the power of the signal light in each channel so as to obtain an optimum power relativity in the WDM signal light to be output from optical transmitting device 110, according to the monitor signal sent from second terminal station 100. Then, an optical transmitter in each channel is controlled according to a calculated value of the power.

Moreover, the various optical transmitting stations according to the above embodiments of the present invention (such as the optical transmitting stations illustrated in FIGS. 5, 9, 10 and 13) can easily be incorporated into the optical communication systems illustrated in FIGS. 1 and 17. Thus, with any of these configurations for an optical transmitting station, the SNR in each channel at a receiving station can be detected, sent to the transmitting station, and used by a controller of the transmitting station to adjust the power levels of the transmitted WDM signal to obtain an equal SNR in each channel at the receiving station.

Therefore, according to the above embodiments of the present invention, it is possible to provide an optical communication system which can obtain a desired power relativity of WDM signal light. Moreover, the above embodiments of the present invention can be applied to an optical communication system as illustrated in FIG. 1.

The above embodiments of the present invention relate to the "power relativity" of a WDM signal. The "power relativity" refers to the relative power levels of the various signal lights of a WDM signal light. Thus, when the relative powers of the various signal lights change, the "power relativity" of the WDM signal light changes.

According to the above embodiments of the present invention, a spectrum monitor uses a light dispersing device to disperse a received light into a plurality of disbursed lights travelling, respectively, in a plurality of different directions according to wavelength. Thus, different wavelength components of the received light will be separated into the different disbursed lights. Therefore, a light dispersing device could also be referred to as a "wavelength component extracting device", since a light dispersing device essentially extracts wavelength components from a received light. However, various filters could also be used as a wavelength component extracting device in a spectrum monitor, to extract various wavelength components from received light.

Various optical couplers are described above as having specific branching ratios. However, many different branching ratios can be used, and the present invention is not limited to optical couplers having a specific branching ratio.

Various components are described herein as being "operatively connected". The terms "operatively connected", as used herein, include, for example, a connection where (a) optical components are directly connected together by fiber connection, (b) optical components are spatially connected using, for example, a collimated beam, and (c) optical components are connected through another optical component.

Various spectrum monitor configurations are disclosed herein. However, there are many different types of spectrum monitors which can be used in the above embodiments of the present invention.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. An apparatus comprising:
   a plurality of transmitters producing a plurality of individual signal lights, respectively, the plurality of individual signal lights being combined into a wavelength division multiplexed (WDM) signal light which is transmitted through a first optical fiber transmission line and then received by a receiving station from the first optical fiber transmission line;
   a plurality of level controllers controlling power levels of the individual signal lights; and
   a controller receiving a monitor signal through a second optical fiber transmission line different from the first optical fiber transmission line, the monitor signal indicating a signal to noise ratio (SNR) of each individual signal light as monitored at the receiving station, the controller controlling the plurality of level controllers in accordance with the received monitor signal to obtain predetermined signal to noise ratios of the plurality of individual signal lights at the receiving station.

2. An apparatus as in claim 1, wherein the controller controls the plurality of level controllers to control relative power levels of the plurality of individual signal lights with respect to each other.

3. An apparatus as in claim 1, wherein the controller controls the plurality of level controllers to control relative power levels of the plurality of individual signal lights with respect to each other to be constant.

4. An apparatus as in claim 1, wherein the controller controls the plurality of level controllers to control the power levels of the plurality of individual signal lights to perform preemphasis on the WDM signal light.

5. An apparatus as in claim 1, wherein the controller controls the plurality of level controllers to control the power levels of the plurality of individual signal lights to obtain substantially equal signal to noise ratios of the plurality of individual signal lights at the receiving station.

6. An apparatus as in claim 1, wherein the controller controls the plurality of level controllers to control the power levels of the plurality of individual signal lights to perform preemphasis on the WDM signal light and thereby obtain substantially equal signal to noise ratios of the plurality of individual signal lights at the receiving station.

7. An apparatus as in claim 1, further comprising:
   a multiplexer multiplexing the plurality of individual signal lights together to produce the WDM signal light, and providing the WDM signal light to the first optical fiber transmission line.

8. An apparatus as in claim 1, wherein
   the plurality of level controllers comprises a plurality of attenuators respectively corresponding to the plurality of individual signal lights, each attenuator having a variable attenuation for attenuating the corresponding individual signal light, and
   the apparatus further comprises a multiplexer multiplexing the attenuated plurality of individual signal lights together to produce the WDM signal light, and providing the WDM signal light to the first optical fiber transmission line, wherein the controller controls the variable attenuation of the attenuators to control the power levels of the plurality of individual signal lights.

9. An apparatus as in claim 1, wherein
   the plurality of level controllers comprises a plurality of optical amplifiers respectively corresponding to the plurality of individual signal lights, each optical amplifier having a variable gain and amplifying the corresponding individual signal light in accordance with the variable gain; and
   the apparatus further comprises a multiplexer multiplexing the amplified plurality of individual signal lights together to produce the WDM signal light, and providing the WDM signal light to the first optical fiber transmission line, wherein the controller controls the variable gains to control the power levels of the plurality of individual signal lights.

10. An apparatus as in claim 1, further comprising:
    a multiplexer multiplexing the plurality of individual signal lights together to produce the WDM signal light, and providing the WDM signal light to the first optical fiber transmission line; and
    a plurality of optical connectors respectfully corresponding to the plurality of transmitters and connecting the plurality of transmitters to the multiplexer so that the plurality of individual signal lights are provided to, and multiplexed by, the multiplexer.

11. An apparatus transmitting, to a receiving station, through an optical fiber, a wavelength division multiplexed (WDM) signal light including a plurality of individual signal lights, the apparatus comprising:
    a plurality of transmitters respectively corresponding to the plurality of individual signal lights, each transmitter producing the corresponding individual signal light;
    a plurality of level controllers controlling power levels of the individual signal lights; and
    a controller controlling the plurality of level controllers to obtain predetermined signal to noise ratios of the plurality of individual signal lights at the receiving station, wherein
    the plurality of level controllers comprises a plurality of optical amplifiers respectively corresponding to the plurality of individual signal lights, each optical amplifier receiving pump light and amplifying the corresponding individual signal light in accordance with the received pump light and
    the apparatus further comprises a multiplexer multiplexing the amplified plurality of individual signal lights together to produce the WDM signal light, and providing the WDM signal light to the optical fiber, wherein the controller controls the pump lights to control the power levels of the plurality of individual signal lights.

12. An apparatus transmitting, to a receiving station, through an optical fiber, a wavelength division multiplexed (WDM) signal light including a plurality of individual signal lights, the apparatus comprising:
    a plurality of transmitters respectively corresponding to the plurality of individual signal lights, each transmitter producing the corresponding individual signal light;
    a plurality of level controllers controlling power levels of the individual signal lights; and
    a controller controlling the plurality of level controllers to obtain predetermined signal to noise ratios of the plurality of individual signal lights at the receiving station, wherein
    the plurality of level controllers comprises a plurality of optical amplifiers respectively corresponding to the plurality of individual signal lights, each optical amplifier including
    a doped fiber, and
    a light source producing pump light and providing the pump light to the doped fiber, the corresponding individual signal light traveling through the doped fiber to be amplified by the pump light, and the apparatus further comprises a multiplexer multiplexing the amplified plurality of individual signal lights together to produce the WDM signal light, and providing the WDM signal light to the optical fiber, wherein the controller controls the pump lights produced by the light sources to control the power levels of the plurality of individual signal lights.

13. An apparatus transmitting, to a receiving station, through an optical fiber, a wavelength division multiplexed (WDM) signal light including a plurality of individual signal lights, the apparatus comprising:

a plurality of transmitters respectively corresponding to the plurality of individual signal lights, each transmitter producing the corresponding individual signal light;

a plurality of level controllers controlling power levels of the individual signal lights;

a controller controlling the plurality of level controllers to obtain predetermined signal to noise ratios of the plurality of individual signal lights at the receiving station; and a combining mechanism combining the plurality of individual signal lights with a plurality of tone components, respectively, wherein the controller determines an amplitude of each tone component of the plurality of tone components from a decoupled portion of the WDM signal light and determines the spectrum of the WDM signal light from the determined amplitudes.

14. An apparatus comprising:

first and second optical fiber transmission lines;

a plurality of transmitters producing a plurality of respectively corresponding individual signal lights that each have a corresponding power level;

a plurality of level controllers controlling power levels of the individual signal lights;

a multiplexer multiplexing the plurality of individual signal lights together to produce a WDM signal light, and transmitting the WDM signal light through the first optical fiber transmission line;

a receiving station receiving the WDM signal light through the first optical fiber transmission line;

a signal to noise ratio (SNR) monitor monitoring a SNR of each individual signal light at the receiving station in accordance with the WDM signal received by the receiving station;

a monitor control device generating a monitor signal indicating the monitored SNR of each individual signal light, the monitor signal being transmitted through the second optical fiber transmission line; and a controller receiving the monitor signal through the second optical fiber transmission line and controlling the plurality of level controllers in accordance with the received monitor signal to obtain predetermined signal to noise ratios of the plurality of individual signal lights at the receiving station.

15. An apparatus as in claim 14, wherein the controller controls the plurality of level controllers to control relative power levels of the plurality of individual signal lights with respect to each other.

16. An apparatus as in claim 14, wherein the controller controls the plurality of level controllers to control the power levels of the plurality of individual signal lights to perform preemphasis on the WDM signal light.

17. An apparatus as in claim 14, wherein the controller controls the plurality of level controllers to control the power levels of the plurality of individual signal lights to perform preemphasis on the WDM signal light and thereby obtain substantially equal signal to noise ratios of the plurality of individual signal lights at the receiving station.

18. An apparatus comprising:

a plurality of transmitters producing a plurality of individual signal lights, respectively, the plurality of individual signal lights being combined into a wavelength division multiplexed (WDM) signal light which is transmitted through a first optical fiber transmission line and then received by a receiving station from the first optical fiber transmission line;

a plurality of level controllers respectively corresponding to the plurality of individual signal lights, each level controller controlling a power level of the corresponding individual signal light; and means for receiving a monitor signal through a second optical fiber transmission line different from the first optical fiber transmission line, the monitor signal indicating a signal to noise ratio (SNR) of each of the individual signal lights as measured at the receiving station; and means for controlling the plurality of level controllers in accordance with the received monitor signal to obtain predetermined signal to noise ratios of the plurality of individual signal lights at the receiving station.

19. A method comprising individually controlling power levels of a plurality of individual signal lights with a plurality of level controllers, respectively;

combining the plurality of power level controlled individual signal lights into a wavelength division multiplexed (WDM) signal light;

transmitting the WDM signal light through a first optical fiber transmission line to be received by a receiving station;

monitoring a signal to noise ratio (SNR) of each individual signal at the receiving station in accordance with the WDM signal light received by the receiving station;

generating a monitor signal indicating the monitored SNR of each individual signal light;

transmitting the monitor signal through a second optical fiber transmission line;

receiving the monitor signal transmitted through the second optical fiber transmission line; and controlling the plurality of level controllers in accordance with the received monitor signal to obtain predetermined signal to noise ratios of the plurality of individual signal lights at the receiving station.

20. An apparatus comprising:

a plurality of level controllers controlling power levels of a plurality of individual signal lights, respectively;

a multiplexer multiplexing the power level controlled individual signal lights together into a wavelength division multiplexed (WDM) signal light which is transmitted through a first optical fiber transmission line;

a receiver receiving the WDM signal light transmitted through the first optical fiber transmission line;

a signal to noise ratio (SNR) monitor monitoring a SNR of each individual signal light at the receiver in accordance with the WDM signal light received by the receiver;

a monitor control device generating a monitor signal indicating the monitored SNR of each individual signal light, the monitor signal being transmitted through a second optical fiber transmission line; and a controller receiving the monitor signal through the second optical fiber transmission line and controlling the plurality of level controllers in accordance with the received monitor signal to obtain predetermined signal to noise ratios of the plurality of individual signal lights at the receiver.

21. An apparatus comprising:

a controller individually controlling power levels of a plurality of individual signal lights, respectively; and a multiplexer multiplexing the power level controlled individual signal lights together into a wavelength division multiplexed (WDM) signal light which is transmitted through a first optical fiber transmission line to a receiver, wherein the controller individually controls the power levels of the plurality of individual signal lights to obtain predetermined signal to noise ratios of the plurality of individual signal lights at the receiver in accordance with a monitor signal transmitted to the controller through a second optical fiber transmission line different from the first optical fiber transmission line, the monitor signal indicating measured values of SNR of the individual signal lights as measured at the receiver.

22. An apparatus comprising:

first and second optical fiber transmission lines;

a plurality of transmitters producing a plurality of individual signal lights, respectively, the plurality of individual signal lights being combined into a wavelength division multiplexed (WDM) signal light which is transmitted through the first optical fiber transmission line;

a receiving station receiving the WDM signal light through the first optical fiber transmission line;

a monitor monitoring a signal to noise ratio (SNR) of each individual signal light at the receiving station, generating a monitor signal indicating the monitored SNRs, and transmitting the monitor signal through the second optical fiber transmission line;

a plurality of level controllers controlling power levels of the individual signal lights; and a controller receiving the monitor signal through the second optical fiber transmission line and controlling the plurality of level controllers in accordance with the received monitor signal to obtain predetermined signal to noise ratios of the plurality of individual signal lights at the receiving station.

23. An apparatus comprising:

first and second optical fiber transmission lines;

a plurality of transmitters producing a plurality of individual signal lights, respectively, the plurality of individual signal lights being combined into a wavelength division multiplexed (WDM) signal light which is transmitted through the first optical fiber transmission line;

a receiving station receiving the WDM signal light through the first optical fiber transmission line;

means for monitoring a signal to noise ratio (SNR) of each individual signal light at the receiving station, for generating a monitor signal indicating the monitored SNRs, and for transmitting the monitor signal through the second optical fiber transmission line;

a plurality of level controllers controlling power levels of the individual signal lights; and means for receiving the monitor signal through the second optical fiber transmission line and for controlling the plurality of level controllers in accordance with the received monitor signal to obtain predetermined signal to noise ratios of the plurality of individual signal lights at the receiving station.

24. An apparatus comprising:

a plurality of transmitters producing a plurality of individual signal lights, respectively;

a plurality of optical amplifiers respectively corresponding to the plurality of individual signal lights, each optical amplifier receiving pump light and amplifying the corresponding individual signal light in accordance with the received pump light;

a multiplexer multiplexing the amplified plurality of individual signal lights together to produce a wavelength division multiplexed (WDM) signal light, and providing the WDM signal light to an optical fiber for transmission through the optical fiber to a receiver; and a controller controlling the pump lights to control power levels of the plurality of individual signal lights to obtain predetermined signal to noise ratios of the plurality of individual signal lights at the receiver.

25. An apparatus comprising:

a plurality of transmitters producing a plurality of individual signal lights, respectively;

a plurality of optical amplifiers respectively corresponding to the plurality of individual signal lights, each optical amplifier including a doped fiber and a light source providing pump light to the doped fiber, the corresponding individual signal light traveling through the doped fiber to be amplified by the pump light;

a multiplexer multiplexing the amplified plurality of individual signal lights together to produce a wavelength division multiplexed (WDM) signal light, and providing the WDM signal light to an optical fiber for transmission through the optical fiber to a receiver; and a controller controlling the pump lights produced by the light sources to control power levels of the plurality of individual signal lights to obtain predetermined signal to noise ratios of the plurality of individual signal lights at the receiver.

* * * * *